US010325363B2

(12) United States Patent
Weiss et al.

(10) Patent No.: US 10,325,363 B2
(45) Date of Patent: Jun. 18, 2019

(54) METHODS FOR AUTOMATICALLY GENERATING A COMMON MEASUREMENT ACROSS MULTIPLE ASSEMBLY UNITS

(71) Applicant: Mecha Industries, Inc., Palo Alto, CA (US)

(72) Inventors: Samuel Bruce Weiss, Palo Alto, CA (US); Anna-Katrina Shedletsky, Palo Alto, CA (US); John James Shedletsky, III, Palo Alto, CA (US); Isaac Sukin, San Francisco, CA (US); Simon Kozlov, Burlingame, CA (US)

(73) Assignee: Instrumental, Inc., Los Altos, CA (US)

(*) Notice: Subject to any disclaimer, the term of this patent is extended or adjusted under 35 U.S.C. 154(b) by 210 days.

(21) Appl. No.: 15/407,158

(22) Filed: Jan. 16, 2017

(65) Prior Publication Data
US 2017/0206643 A1  Jul. 20, 2017

Related U.S. Application Data

(60) Provisional application No. 62/279,174, filed on Jan. 15, 2016.

(51) Int. Cl.
G06T 7/11         (2017.01)
G06T 7/13         (2017.01)
G06T 7/60         (2017.01)
G06T 7/00         (2017.01)
G06F 3/0484       (2013.01)
G06F 3/0485       (2013.01)
(Continued)

(52) U.S. Cl.
CPC ............ G06T 7/001 (2013.01); G06F 3/0485 (2013.01); G06F 3/04842 (2013.01); G06F 3/04845 (2013.01); G06K 9/4604 (2013.01); G06T 7/11 (2017.01); G06T 7/13 (2017.01); G06T 7/60 (2013.01); G06T 11/60 (2013.01);
(Continued)

(58) Field of Classification Search
CPC ....... G06F 2203/04806; G06F 3/04842; G06T 7/0016
See application file for complete search history.

(56) References Cited

U.S. PATENT DOCUMENTS 5,734,384 A * 3/1998 Yanof .................... G06T 17/10
                                                   345/419
6,400,846 B1   6/2002 Lin et al.
(Continued)

Primary Examiner — Scott T Baderman
Assistant Examiner — Mario M Velez-Lopez
(74) Attorney, Agent, or Firm — Run8 Patent Group, LLC; Peter Miller

(57) ABSTRACT

A method includes: displaying a first image of a first assembly unit within a user interface; locating a first virtual origin at a first feature on the first assembly unit; displaying a first subregion of the first image within the user interface responsive to a change in a view window of the first image; recording a geometry and a position of the first subregion relative to the first virtual origin; locating a second virtual origin at a second feature—analogous to the first feature— on a second assembly unit represented in the second image; projecting the geometry and the position of the first subregion onto the second image according to the second virtual origin to define a second subregion of the second image; and, in response to receipt of a command to advance from the first image to the second image, displaying the second subregion within the user interface.

19 Claims, 9 Drawing Sheets

(51) Int. Cl.
  G06T 11/60 (2006.01)
  G06K 9/46 (2006.01)
(52) U.S. Cl.
  CPC .............. *G06F 2203/04806* (2013.01); *G06K 2209/19* (2013.01); *G06T 2200/24* (2013.01); *G06T 2207/10004* (2013.01); *G06T 2207/10016* (2013.01); *G06T 2207/20092* (2013.01); *G06T 2207/20164* (2013.01); *G06T 2207/20221* (2013.01); *G06T 2207/30108* (2013.01)

(56) References Cited

U.S. PATENT DOCUMENTS

| | | | |
|---|---|---|---|
| 9,445,713 B2* | 9/2016 | Douglas | A61B 1/00009 |
| 2004/0247174 A1 | 12/2004 | Lyons et al. | |
| 2007/0234203 A1* | 10/2007 | Shagam | G06F 17/211 |
| | | | 715/210 |
| 2007/0286495 A1* | 12/2007 | Pine | G06K 9/2036 |
| | | | 382/209 |
| 2009/0088999 A1* | 4/2009 | Bryll | G01B 11/0608 |
| | | | 702/86 |
| 2010/0111434 A1* | 5/2010 | Madden | G06F 3/04817 |
| | | | 382/255 |
| 2011/0149138 A1* | 6/2011 | Watkins | G06F 3/0485 |
| | | | 348/333.02 |
| 2011/0161876 A1* | 6/2011 | Chang | G06T 7/13 |
| | | | 715/810 |
| 2014/0334699 A1* | 11/2014 | Wilson | G06T 11/001 |
| | | | 382/128 |
| 2015/0161821 A1* | 6/2015 | Mazula | G06T 19/006 |
| | | | 345/419 |
| 2015/0300962 A1* | 10/2015 | Hashim | G01N 21/9515 |
| | | | 356/237.1 |

* cited by examiner

METHODS FOR AUTOMATICALLY GENERATING A COMMON MEASUREMENT ACROSS MULTIPLE ASSEMBLY UNITS

CROSS-REFERENCE TO RELATED APPLICATIONS

This Application claims the benefit of U.S. Provisional Application No. 62/279,174, filed on 15 Jan. 2016, which is incorporated in its entirety by this reference.

TECHNICAL FIELD

This invention relates generally to the field of optical inspection and more specifically to new and useful methods for automatically generating a common measurement across multiple assembly units in the field of optical inspection.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Assembly Line Configuration

Figure 1:
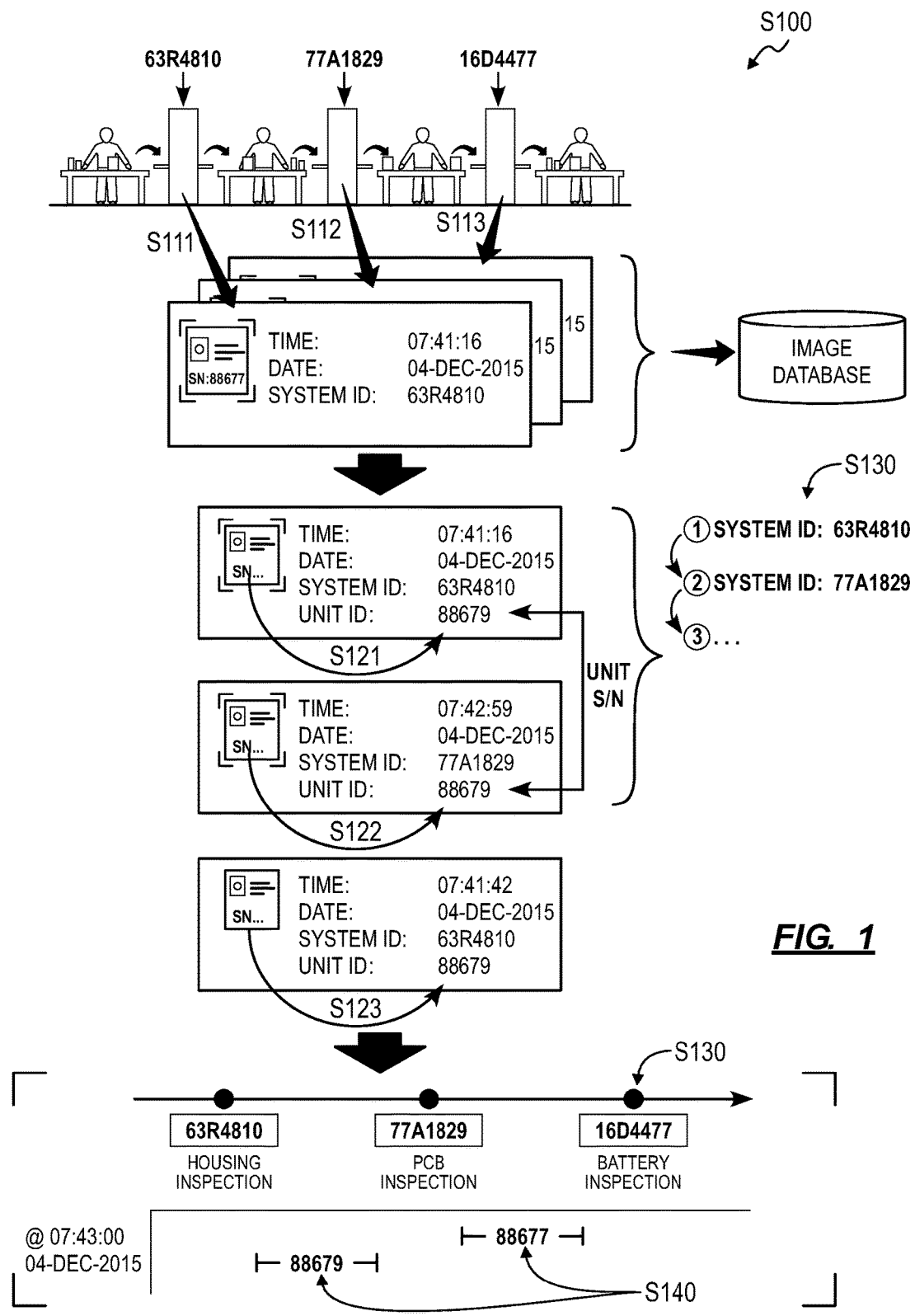
FIG. 1 is a flowchart representation of a first method.

As shown in FIG. 1, a first method S100 for automatically configuring optical inspection along an assembly line includes: retrieving a first image captured by a first optical inspection station at a first time in Block S111, the first image associated with an identifier of the first optical inspection station and a first timestamp corresponding to the first time; retrieving a second image captured by a second optical inspection station at a second time succeeding the first time in Block S112, the second image associated with an identifier of the second optical inspection station and a second timestamp corresponding to the second time; retrieving a third image captured by the first optical inspection station at a third time succeeding the first time in Block S113, the third image associated with the identifier of the first optical inspection station and a third timestamp corresponding to the third time; identifying a first serial number of a first assembly unit in the first image in Block S121; identifying the first serial number in the second image in Block S122; identifying a second serial number of a second assembly unit in the third image in Block S123; determining positions of the first optical inspection station and the second optical inspection station along the assembly line based on the first timestamp preceding the second timestamp and identification of the first serial number in the first image and in the second image in Block S130; determining positions of the first assembly unit and the second assembly unit along the assembly line at a particular time based on identification of the first serial number in the second image associated with the second timestamp and identification of the second serial number in the third image associated with the third timestamp in Block S140; within a user interface, rendering a virtual representation of the assembly line and virtual representations of the first assembly unit and the second assembly unit along the assembly line at the particular time based on the determined positions of the first optical inspection station and the second optical inspection station and the determined positions of the first assembly unit and the second assembly unit at the particular time in Block S150.

1.1 Applications

Figure 2:
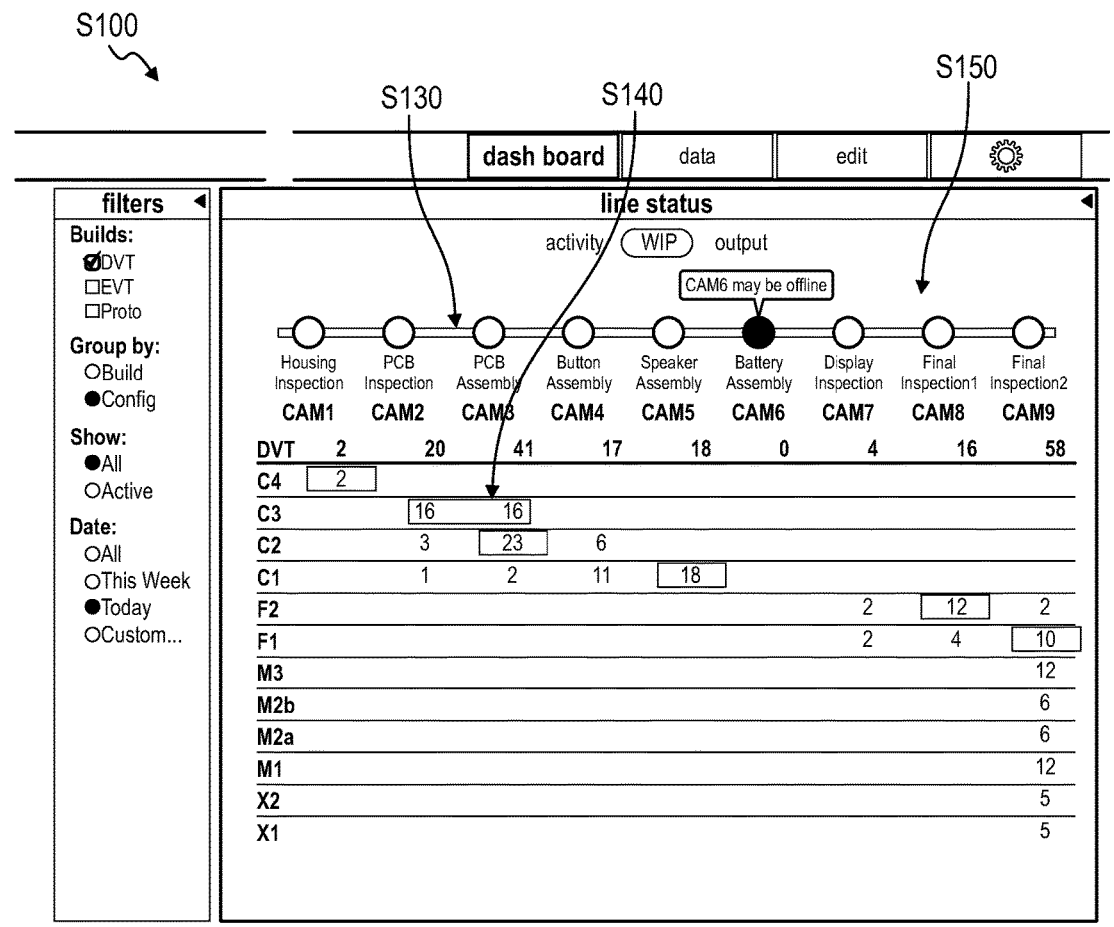
FIG. 2 is a graphical representation of one variation of the first method.

Generally, a production validation system (hereinafter the "system") can execute Blocks of the first method S100 to automatically configure multiple optical inspection stations along an assembly line after the assembly line and optical inspection stations have been installed and after images of units passing through the assembly line have been imaged by the optical inspection stations. In particular, the first method S100 can be executed by a local or remote computer system that communicates with one or more optical inspection stations to collect images of assembly units in near real-time, interfaces with a local or remote database to retrieve stored images, and/or hosts a user interface (e.g., at a user's smartphone, tablet, or desktop computer) to serve images and related data to the user and to receive image selections and other inputs from the user. Optical inspection stations (described below) can be inserted into an assembly line at various assembly stages and immediately used to capture images of units passing through the assembly line. The optical inspection stations can upload these images to a (local or remote) database, such as in real-time or asynchronously, with a timestamp of when each image was captured and an identifier of the optical inspection station that captured each image (e.g., "image metadata"). The system can then execute Blocks of the first method S100—such as locally at a computer system connected directly to the assembly line, within a native application or web browser executing on a mobile computing device logged into the assembly, or remotely at a remote server—to automatically identify optical inspection stations inserted into the assembly line, to automatically identify the order of optical inspection stations along the assembly line, and to automatically determine the positions of various units along the assembly line at a particular (e.g., current) instance in time based on visual data contained in the images and image metadata received from the optical inspection stations. The system can then automatically configure a virtual representation of the assembly line, including relative positions of optical inspection stations and relative positions of units along the assembly line, as shown in FIG. 2. The system can therefore execute Blocks of the first method S100 to automatically configure optical inspection stations along an assembly line and to generate a virtual representation of the state of units within the assembly line for presentation to a user substantially in real-time as units are assembled.

The system can execute the first method S100 to collect, process, and manipulate images of test assemblies (hereinafter "units") during product development, such as during a prototype build, an engineering validation test (EVT), design validation test (DVT), and/or production validation test (PVT). The system collects, processes, and manipulates images of units captured by one or more optical inspection stations during a prototype build event (or "build"), such as over several hours, days, or weeks in which dozens, hundreds, or thousands of units are assembled and tested. The system can also be implemented within a batch or mass production assembly line for in-process quality control, early defect detection, etc. within a production run. The system can also integrate into a manual-pass-type assembly line or into a conveyor-type assembly line.

Furthermore, the system can be implemented across a distributed assembly line, such as across physically co-located assembly lines or assembly lines installed in different buildings on a single campus, installed on different campuses of the same company or different companies, and/or installed in different cities, regions, countries, or continents. For example, multiple sets of optical inspection stations can be installed within each of multiple discrete and remotely-located assembly lines for a product or subassembly of a product, and the system can aggregate images captured and uploaded by the optical inspection stations into a single distributed assembly line for the product or subassembly. Similarly, the system can be implemented within a raw material processing facility, an injection molding facility, a casting and machining facility, any sub-assembly or main assembly layer in assembly facility, an inspection facility, a testing and reliability test facility, a validation or failure analysis facility, a packing facility, a shipping facility, a field use facility, a field return facility, and/or a field return failure analysis, etc. during production, testing, and/or validation of a single component, a subassembly, a main assembly, etc. The system is described herein for integration with an assembly line. However, the system can be integrated with any one or more manufacturing, assembly, testing, validation, and/or other production processes for a single component, subassembly, main assembly, etc. (hereinafter a "unit").

1.2 Optical Inspection Station

The system includes one or more optical inspection stations. Each optical inspection station can include: an imaging platform that receives a part or assembly; a visible light camera (e.g., a RGB CMOS, or black and white CCD camera) that captures images (e.g., digital photographic color images) of units placed on the imaging platform; and a data bus that offloads images, such as to a local or remote database. An optical inspection station can additionally or alternatively include multiple visible light cameras, one or more infrared cameras, a laser depth sensor, etc.

In one implementation, an optical inspection station also includes a depth camera, such as an infrared depth camera, configured to output depth images. In this implementation, the optical inspection station can trigger both the visible light camera and the depth camera to capture a color image and a depth image, respectively, of each unit set on the imaging platform. Alternatively, the optical inspection station can include optical fiducials arranged on and/or near the imaging platform. In this implementation, the optical inspection station (or a local or remote computer system interfacing with the remote database) can implement machine vision techniques to identify these fiducials in a color image captured by the visible light camera and to transform sizes, geometries (e.g., distortions from known geometries), and/or positions of these fiducials within the color image into a depth map, into a three-dimensional color image, or into a three-dimensional measurement space (described below) for the color image.

The system is described herein as including one or more optical inspection stations and generating a virtual representation of an assembly line including the one or more optical inspection stations. However, the system can additionally or alternatively include any other type of sensor-laden station, such as an oscilloscope station including NC-controlled probes, a weighing station including a scale, a surface profile station including an NC-controlled surface profile gauge, or a station including any other optical, acoustic, thermal, or other type of contact or non-contact sensor.

1.3 Automatic Configuration

Following insertion of a set of optical inspection stations into an assembly line, the optical stations can capture and upload color images of units passing through the optical inspection stations to a local or remote database. Upon receipt of an image from a deployed optical inspection station, the system can: implement optical character recognition techniques or other machine vision techniques to identify and read a serial number, barcode, quick-response ("QR") code, or other visual identifier of a unit within the image; generate an alphanumeric tag representing this serial number, barcode, QR code, or other visual identifier; and then add this alphanumeric tag to the metadata received with the image. The system can thus receive images of various units in Block S111, S112, and S113 and then read identifying information of these units from these images in Blocks S121, S122, and S123. (Each optical inspection station can alternatively include an RFID reader, an NFC reader, or other optical or radio reader that locally reads a serial number from a unit placed on its imaging platform, and the optical inspection station can add a serial number read from a unit to metadata of an image of the assembly unit.)

In Block S130, the system can then process unit serial numbers, optical inspection station identifiers (e.g., serial numbers), and timestamps (i.e., times that units of known unit serial numbers entered optical inspection station of known identifiers) contained in metadata of images received from the optical inspection stations to determine the order of optical inspection stations along the assembly line, as shown in FIG. 1. In one implementation, as images are received from optical inspection stations, the system: buckets a set of images containing a tag for a specific unit serial number; extracts optical inspection station serial number tags and timestamps from metadata in this set of images; and orders these optical inspection station serial numbers (from first to last in an assembly line) according to their corresponding timestamps (from oldest to newest). In particular, a unit progresses through assembly over time and is sequentially imaged by optical inspection stations along an assembly line, and the system can transform unit serial numbers, optical inspection station serial numbers, and timestamps stored with images received from these optical inspection stations into identification of a group of optical inspection stations as corresponding to one assembly line and confirmation of the order of the optical inspection stations along this assembly line. The system can repeat this process for other unit serial numbers—such as for each serial number of a unit entering the first optical inspection station in this ordered set of optical inspection stations—in order to confirm the determined order of optical inspection stations along an assembly line and to automatically detect reconfiguration of optical inspection stations on the assembly line (e.g., in real-time).

In this implementation, the system can also pass these optical inspection station serial numbers into a name mapping system (e.g., a DNS) to retrieve optical inspection station-specific information, such as make, model, last user-entered name, configuration (e.g., imaging platform size, optical resolution, magnification capacity), owner or lessee, etc. for each optical inspection station. The system can similarly pass unit serial numbers into a name mapping system or other database to retrieve unit-specific data, such as assigned build, configuration, bill of materials, special assembly instructions, measurements, photographs, notes, etc.

In Block S150, the system can then generate a virtual representation of the ordered optical inspection stations along an assembly line, such as shown in FIG. 2. The system can label virtual representations of the optical inspection stations with a make, model, name, configuration, serial number, etc. retrieved from a remote database or according to a name or description entered by a user. The system can then upload the virtual representation of the assembly line to a local or remote computer system (e.g., a smartphone, a tablet, a desktop computer) for access by a user. The system can also receive images from optical inspection stations across multiple distinct assembly lines and can implement the foregoing methods and techniques substantially in real time to bucket images of units on different assembly lines, to identify multiple assembly lines and optical inspection station order in each assembly line, to generate a unique virtual representation of each assembly line represented by the images, and to distribute these virtual assembly line representations to their corresponding owners.

The system can also repeat the foregoing methods and techniques throughout operation of the assembly line in order to detect insertion of additional optical inspection stations into the assembly line, to detect removal of optical inspection stations from the assembly line, and/or to detect rearrangement of optical inspection stations within the assembly line and to automatically update the virtual representation of the assembly line accordingly.

1.4 Assembly Line Status

In Block S140, the system can identify the current position of a unit within the assembly line based on the optical inspection station serial number tag stored with the last image—containing a unit serial number for the assembly unit—received from the assembly line. For example, for a unit within the assembly line, the system can determine that a particular unit is between a first optical inspection station and a second optical inspection station along the assembly line if the last image containing a unit serial number tag for the particular unit was received from the second optical inspection station (i.e., contains an optical inspection station serial number tag for the first optical inspection station). In this example, the system can determine that the particular unit is at the second optical inspection station along the assembly line if the last image containing the assembly unit serial number tag for the particular unit was recently received from the second optical inspection station by another image of another unit that has not yet been received from the second optical inspection station. Furthermore, in this example, the system can determine that assembly of the particular unit has been completed if the last image containing the assembly unit serial number tag for the particular unit was received from a last known optical inspection station on the assembly line.

The system can repeat the foregoing process for unit serial numbers of other units identified in images received from the optical inspection stations inserted along an assembly line. The system can then populate the virtual representation of the assembly line described above with a heat map of current unit position, as shown in FIGS. 1 and 2. As each new image is received from an optical inspection station on the assembly line and a new position of a particular unit along the assembly line thus determined, the system can update the virtual representation of the assembly line to reflect the new determined position of the particular unit in Block S150. The system can also pulse or otherwise animate a marker representative of the particular unit within the virtual representation of the assembly line to visually indicate to a user that the particular unit has moved.

The system can implement similar methods and techniques to generate a heat map or other virtual representation of the assembly line at a particular previous time selected by a user based on last images of units received from optical inspection stations along the assembly line prior to the particular previous time. The system can therefore recalculate assembly line states and unit positions at previous times and display virtual representations of these assembly line states for the user substantially in real-time as a user scrolls through a time history of the assembly line. The system can also filter images received from optical inspection stations, such as by build, configuration, date or time, inspection time, etc. based on a user selection for a subset of units on the assembly line; the system can then calculate an assembly line state for the subset of units from the filtered images and display a virtual representation of this assembly line state in Block S150.

However, the system can execute Blocks of the first method in any other way to transform images received from optical inspection stations into a configuration of optical inspection stations along an assembly line and to determine a state of units along the assembly line.

1.5 Defect Detection

In one variation, the system implements machine vision techniques to detect manufacturing defects along the assembly line and augments the virtual representation of the assembly line with locations, types, and/or frequencies of manufacturing defects detected in units passing through the assembly line. For example, the system can implement methods and techniques described below to analyze images of units to detect features (e.g., component dimensions, absolute or relative component positions) that fall outside of dimensions and tolerances specified for the feature. In another example, the system can implement template-matching techniques to detect scratches, dents, and other aesthetic defects on units in images received from optical inspection stations along the assembly line.

In this variation, when a defect on a unit is detected in an earliest image of the assembly unit, the system can flag a unit serial number corresponding to the image in which the defect was detected and then insert a defect flag into the virtual representation of the assembly at a particular optical inspection station at which this image was captured. The system can thus visually indicate to a user through the virtual representation of the assembly line that the defect on the assembly unit occurred between the particular optical inspection station and a second optical inspection station immediately preceding the particular optical inspection station in the assembly line. Furthermore, if the system detects defects shown in multiple images captured at a particular optical inspection station, the system can identify defects of the same type (e.g., similar scratches in the same area on a housing across multiple units) and incorporate a counter for defects of the same defect type into the virtual representation of the assembly line. The system can also visually represent frequency, type, and/or position of detected defects across a batch of units passing through one or more optical inspection stations, such as in the form of a heatmap For example, the system can generate or access a virtual representation of a "nominal" e.g., "generic") unit, calculate a heatmap containing a visual representation of aggregate defects detected in like units passing through a single optical inspection station or passing through multiple optical inspection stations in the assembly line, and then present the heatmap overlayed on the virtual representation of the nominal unit within the user interface.

However, the system can implement any other method or technique to identify a defect in a unit shown in an image captured by an optical inspection station within an assembly line and to indicate the earliest detected presence of this defect on the assembly unit in the virtual representation of the assembly line.

2. Window Mapping

Figure 3:
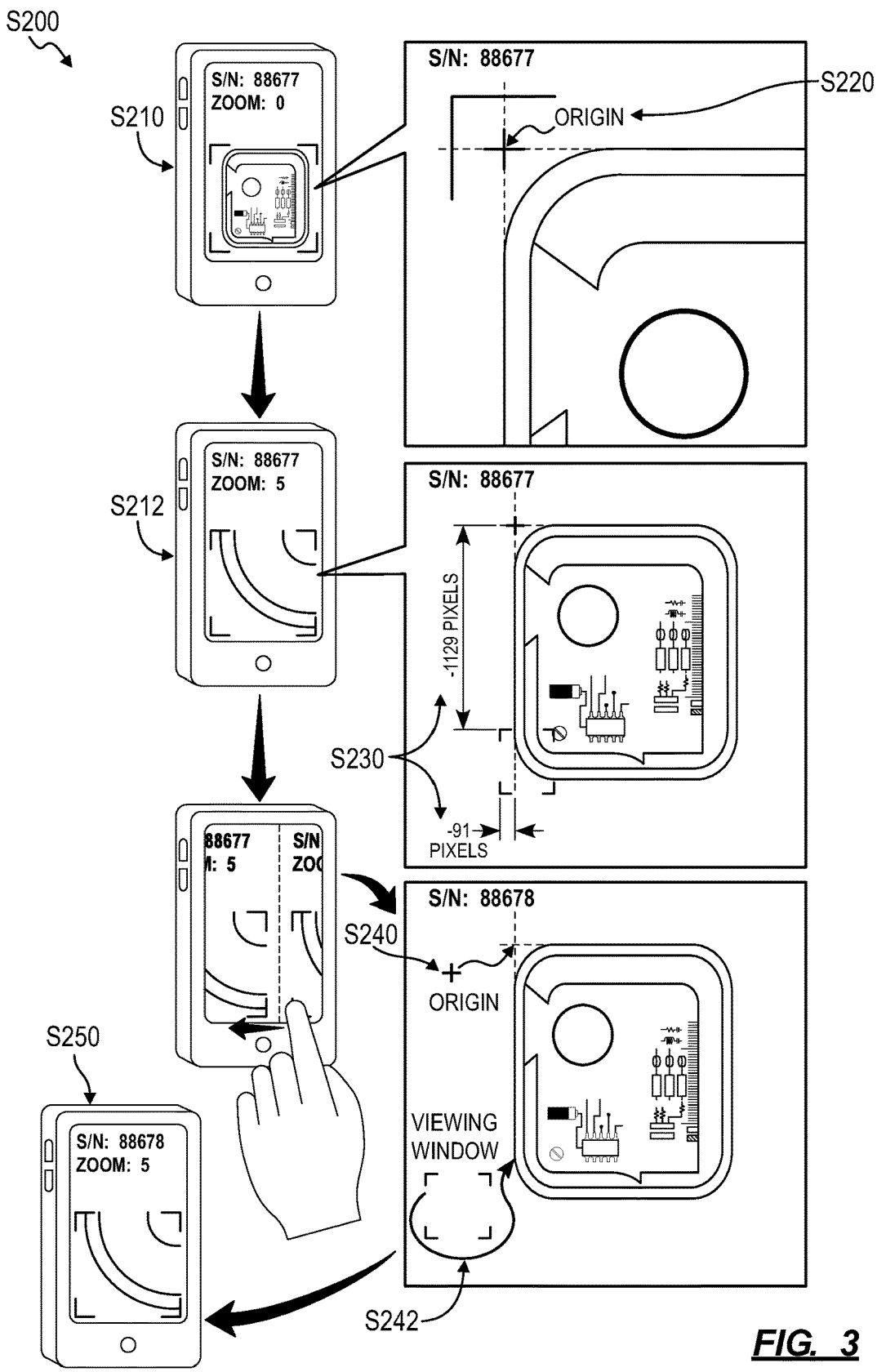
FIG. 3 is flowchart representations of a second method.

As shown in FIG. 3, the second method S200 for rendering images of assembly units along an assembly line, including: rendering a first image of a first assembly unit captured at an optical inspection station within a user interface in Block S210; selecting a first feature within the first image corresponding to the first assembly unit as an origin of the first image in Block S220; in response to receipt of a zoom input, rendering an expanded region of the first image in the user interface in Block S212; storing a size and a position of the expanded region relative to the origin of the first image in Block S230. The second method S200 also includes, in response to advancement from the first image to a second image of a second assembly unit captured at the optical inspection station: selecting a second feature within the second image corresponding to the first feature in the first image as an origin of the second image in Block S240; selecting an expanded region of the second image corresponding to the size and the position of the expanded region of the first image relative to the origin of the second image in Block S242; and rendering the expanded region of the second image in the user interface in Block S250.

One variation of the second method S200 includes: displaying a first image of a first assembly unit within a user interface in Block S210, a form of the first image recorded at an optical inspection station; locating a first virtual origin at a first feature on the first assembly unit represented in the first image in Block S220; in response to a change in a view area of the first image at the user interface, displaying a first subregion of the first image within the user interface in Block S212; and recording a geometry and a position of the first subregion of the first image relative to the first virtual origin in Block S230. The second method S200 also includes, in response to receipt of a command to advance from the first image to a second image of a second assembly unit at the user interface: locating a second virtual origin at a second feature on the second assembly unit represented in the second image in Block S240, the second feature on the second assembly unit analogous to the first feature on the first assembly unit; projecting the geometry and the position of the first subregion of the first image onto the second image according to the second virtual origin to define a second subregion of the second image in Block S242; and displaying the second subregion of the second image within the user interface in Block S250.

Figure 4:
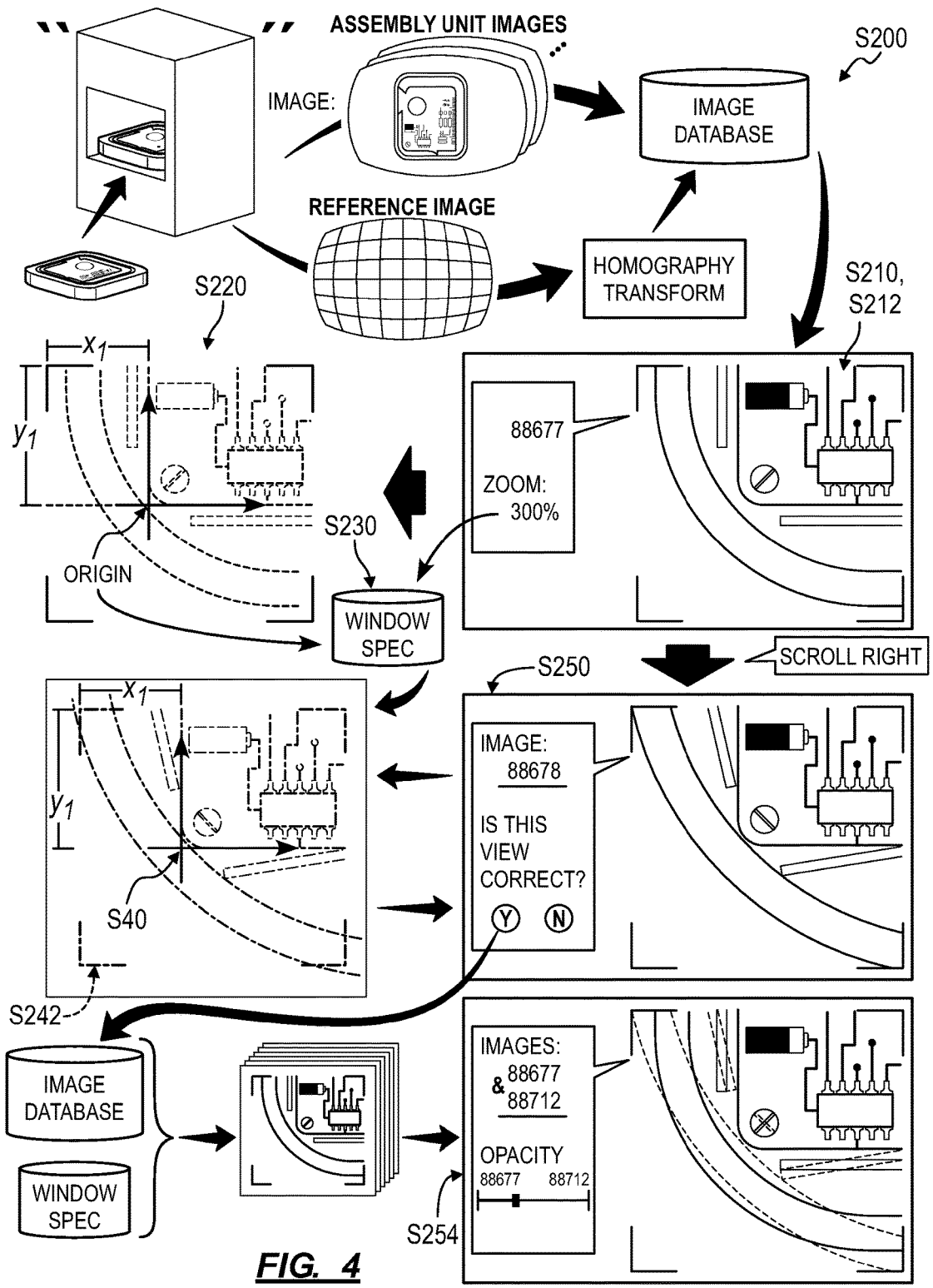
FIG. 4 is flowchart representations of one variation of the second method.

As shown in FIG. 4, another variation of the second method S200 includes: displaying a first image of a first assembly unit within a user interface in Block S210, the first image recorded at an optical inspection station; in response to a change in a view window of the first image at the user interface, displaying a first subregion of the first image within the user interface in Block S212; recording a geometry and a position of the first subregion of the first image relative to a first feature represented in the first image in Block S230; identifying a second feature represented in a second image of a second assembly unit in Block S240, the second feature analogous to the first feature; projecting the geometry and the position of the first subregion of the first image onto the second image according to the second feature to define a second subregion of the second image in Block S242; and in response to receipt of a command to advance from the first image to the second image at the user interface, displaying the second subregion of the second image within the user interface in replacement of the first image in Block S250.

2.1 Applications

Blocks of the second method S200 can be executed locally by a computing device (e.g., a smartphone, a tablet, a desktop computer) in communication with the remote computer system to display images of a set of assembly units (or "units") captured by an optical inspection station along an assembly line. During an image viewing session, the computing device can display images of units of one or more assembly configurations across one or more builds within a user interface rendered on a display integrated into or connected to the computing device (e.g., within a native application or web browser executing on a smartphone, a tablet, or a desktop computer.)

Generally, when a user scrolls through a set of images of units previously captured by a particular optical inspection station, the computing device can execute Blocks of the second method S200 to automatically apply a last zoom level and viewing position from one image rendered in the user interface to a next image selected by the user, thereby enabling the user to scroll through the same expanded view across a sequence of images of multiple units recorded at the same point along an assembly line. In particular, when the user scrolls from a first image to a second image in a set of images of like units, the computing device (or a desktop or handheld computing device interfacing with the computing device) can execute Blocks of the second method S200: to map a last viewing window from a first image of a first unit to a second image of a similar second unit at the same assembly stage based on features within the first and second images; and to automatically render an expanded view of the second image—corresponding to the last rendered expanded view of the first image—in the user interface such that the user can quickly and visually compare local differences between the first unit and the second unit relative to a common virtual origin.

Figure 5:
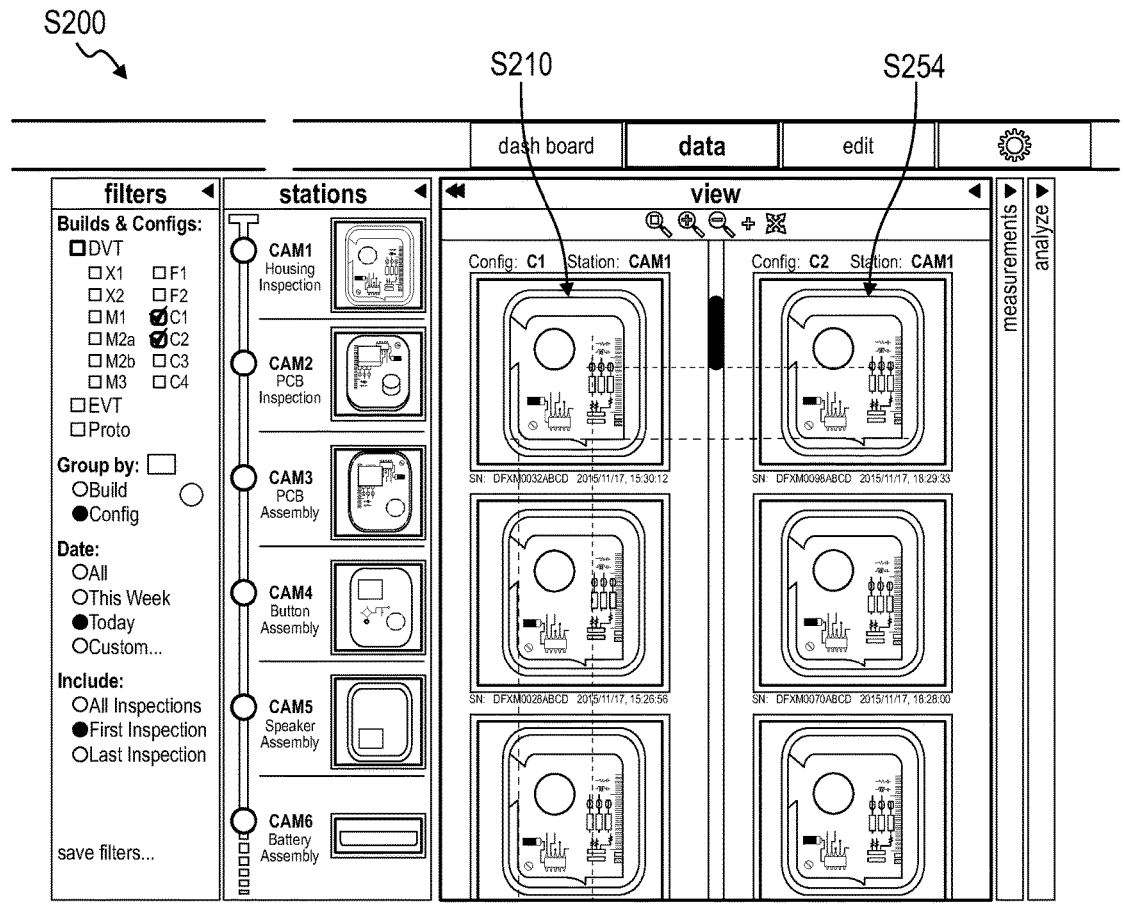
FIG. 5 is a graphical representation of one variation of the second method.

In one example, the computing device can aggregate a set of images of a PCB assembly—including a PCB and components attached to the PCB—captured by a particular optical inspection station during a build. When a user reviews the first image in a set during a first image review session, the computing device can: implement machine vision techniques to detect an upper left corner and an upper horizontal edge of a first PCB shown in the first image; set the upper left corner of the first PCB as the virtual origin in the first image; align the X-axis of the virtual origin in the first image to the upper horizontal edge of the first PCB; render a region of the first image in the user interface; store the X and Y coordinates of the upper-left corner pixel, the upper-right corner pixel, the lower-left corner pixel, and the lower-right corner pixel of the first image rendered in the user interface, relative to the virtual origin, for the last zoom level and viewing position for the first image. When the user then scrolls to a subsequent image in the set, the computing device can similarly: implement machine vision techniques to detect an upper left corner and an upper horizontal edge of a second PCB shown in the second image; set the upper left corner of the second PCB as the virtual origin in the second image; align the X-axis of the virtual origin in the second image to the upper horizontal edge of the second PCB; and immediately render a rectangular region of the second image bounded by four corner pixels at the corner pixel coordinates stored at the last viewing position of the first image. In this example, because the first image and the second image are (virtually) translationally aligned by like virtual origins and rotationally aligned by like X-axis reference features, and because the relative position of the first region of the second image rendered in the user interface—once the user scrolls to the second image—is substantially identical to the relative position of the last region of the first image rendered in the user interface, the user can visually detect differences between component placement in the first PCB assembly shown in the first image and component placement in the second PCB assembly shown in the second image. The computing device can repeat this process when the user scrolls from the second image back to the first image or when the user scrolls from the second image to a third image in the set. As shown in FIG. 5, the computing device can also implement Blocks of the second method S200 to render like regions of images of like units simultaneously, such as in a grid layout or aligned by the view window and laid over one another.

Blocks of the second method S200 are described below as executed by a "system." For example, Blocks of the second method S200 can be implemented by a local computing device (e.g., a smartphone, tablet, or desktop computer) executing the user interface. Alternatively, Blocks of the second method S200 can be executed remotely, such as at a remote server interfacing with a local computing device to serve images to a user and to receive image filter parameters, image selections, and other inputs from the user.

2.2 Images

Block S210 of the second method S200 recites displaying a first image of a first assembly unit within a user interface, wherein a form of the first image was recorded at an optical inspection station. Generally, in Block S210, the system retrieves a first image of a first assembly unit and presents this first image to the user through the user interface; at the user interface, the user may then zoom in to various regions of the first image and shift the first image vertically and horizontally within a zoom window to visually, remotely inspect regions of the first assembly unit represented in these regions of the first image.

2.2.1 Homography Transform

In one implementation, in Block S210, the system retrieves a first digital photographic image—previously recorded by an optical inspection station during an assembly period—from a database. The system then normalizes the first digital photographic image to generate the first image that can then be presented to the user at the user interface. For example, the optical inspection station can include a digital photographic camera and a wide-angle lens coupled to the digital photographic camera; images recorded by the optical inspection station may therefore exhibit perspective distortion. During setup of the optical inspection station, a reference object defining a reference surface—such as a 300-millimeter-square white planar surface with black orthogonal grid lines at a known offset distance of 10 millimeters—can be placed within the optical inspection station, and the optical inspection station can record a "reference image" of the reference surface and upload the reference image to the remote database. The system can then: retrieve the reference image; implement computer vision techniques to identify warped grid lines in the reference image; and then calculate an homography transform that maps warped grid lines in the reference image to straight, orthogonal grid lines. In this example, the system can also calculate a scalar coefficient that relates a digital pixel to a real dimension (i.e., a length value in real space) based on the known distances between grid lines on the reference surface. Therefore, the system can apply the homography transform to the first digital photographic image to generate the "flattened" (or "dewarped") first image and then display the first image—now with perspective distortion removed—within the user interface for presentation to the user. As described below, the system can also extract a real dimension of a feature of the first assembly unit from the first image by summing a number of pixels in the first image spanning the feature and then multiplying this number of pixel by the scalar coefficient.

In the foregoing implementation, the system can transform all other digital photographic images recorded at the same optical inspection station during an assembly period for a particular assembly type at a particular assembly stage according to the same homography transform; the system can also apply the same scalar coefficient to the resulting flattened images. For example, upon receipt of a new digital photographic image from the optical inspection station, the system can: immediately calculate a corresponding flattened image based on the homography transform that is specific to this optical inspection station; and then store the original digital photographic image and the corresponding flattened image together in the database. As described below, the system can also generate a measurement space for the original digital photographic image, a compressed form (e.g., a thumbnail) of the flattened image, a feature space for the flattened image, and/or other images, spaces, or layers related to the digital photographic image or the flattened image and store these data together (e.g., in one file associated with the corresponding assembly unit) in the database. Alternatively, the system can store the digital photographic image in the database and then generate the corresponding flattened image in real time when review of the corresponding assembly unit is requested at the user interface.

2.2.2 Set of Images

The system can define a set of related images by assembly units represented in these images. For example, an optical inspection station can store a timestamp and an optical inspection station identifier in metadata of an image; the system can also write an assembly type and an assembly stage to the image metadata based on the known location of the optical inspection station along an assembly line. The system can also implement computer vision techniques to read a serial number or other optical identifier from a region of the image representing an assembly unit or a fixture locating the assembly unit with the optical inspection station and can write this serial number of other identifier to the image metadata. Furthermore, the system can determine a configuration of the assembly unit represented in the image based on the timestamp, serial number, and/or assembly stage, etc. of the assembly unit and write this configuration to the image metadata. Similarly, the system can implement computer vision techniques (e.g., template matching, pattern matching, object recognition) to extract an assembly type and/or an assembly state of the assembly unit represented in the image directly from the image. The system can repeat this process asynchronously for images stored in the database and in (near) real-time for new images received from deployed optical inspection stations.

The system can then apply various filters to metadata stored with these images to define a set of related images. For example, the system can automatically aggregate all images recorded at one optical inspection station during one assembly period or "build" (e.g., EVT, DVT, or PVT) to define the set of images. Similarly, the system can select—from a body of images recorded across a set of optical inspection stations and representing multiple assembly units in various assembly states—a set of images representing a set of assembly units of the same assembly type and in the same assembly state. The system can also receive a set of filter parameters from the user—such as time window, configuration, build, assembly stage, and/or other filters, as described below—and populate the set of images according to the filter. Furthermore, the system can order images in the set, such as by timestamp or serial number, and display these images in this order as the user scrolls through the set of images within the user interface.

2.3 View Window

Block S212 of the second method S200 recites, in response to a change in a view area of the first image at the user interface, displaying a first subregion of the first image within the user interface. Generally, in Block S212, the system receives an input at the user interface, interprets this input as a command to change the view window of the first image currently rendered within the user interface, and updates the view window accordingly.

In one implementation, the system initially displays the full height and width of the first image within the user interface in Block S210. Upon receipt of a zoom input—such as via a scroll wheel, selection of a zoom level from a dropdown menu, or a zoom level slider—at the user interface, the system redefines a view window to encompass a smaller region of the first image and renders the smaller region of the first image bound by this view window at higher resolution within the user interface in Block S212. The system can then implement methods and techniques described below to select a virtual origin within this new view window and to define geometry and location parameters of the view window relative to the virtual origin.

Once zoomed into the first image, the user may drag or shift the first image vertically or horizontally relative to the view window. The system can then select a new virtual origin within the revised view window and/or redefine geometry and location parameters of the revised view window relative to the current virtual origin. Following a change in zoom level and each change in position of the first image relative to the view window, the system can implement this process automatically: to update a region of the first image and a resolution of this region displayed in the user interface; to reselect a virtual original of the first image (e.g., if the previous virtual origin is not longer within the view window); and to automatically recalculate geometry and location parameters of the view window relative to the current virtual origin.

Alternatively, the system can: automatically update a region of the first image and a resolution of this region displayed in the user interface in real-time in response to a change in zoom level and position of the first image within the view window; and select a virtual original of the first image and recalculate geometry and location parameters of the view window relative to the virtual origin selectively in response to manual entry—through the user interface—of a command to store the current view window and to populate the view window across other images in the set.

However, the system can implement any other methods or techniques to update a region and resolution of the first image rendered within the user interface and to automatically or selectively trigger selection of a virtual origin in the first image in Block S220 and recordation of view window parameters in Block S230.

2.4 First Image: Origin Selection

Block S220 of the second method S200 recites locating a first virtual origin at a first feature on the first assembly unit represented in the first image in Block S220. Generally, in Block S220, the system locates a virtual origin within the first image relative to (e.g., on) a distinguishable feature within the first image; the system can then define the view window for the current region of the first image rendered in the user interface relative to this virtual origin in Block S230. Because the system locates the virtual origin at a distinguishable feature within the first image, the system can implement computer vision techniques to identify analogous (e.g., similar) distinguishable features in other images in the set and to similarly locate virtual origins relative to (e.g., on) these analogous features. By rendering images in the set with their virtual origins at the same position within the user interface and at the same scale and resolution as the first image, the system can preserve a view window set for the first image across other images in the set, thereby enabling the user to view (e.g., scroll through) regions of images of different assembly units positioned relative to a common feature represented in these images.

In particular, locations of like parts, components, and subassemblies may not be positioned in identical locations and orientations—relative to the global assembly unit and to other parts, components, and subassemblies within the assembly unit—across a group of assembly units assembled along the same assembly line over time. Furthermore, a fixture configured to constrain an assembly unit within an optical inspection station may exhibit a non-zero location tolerance such that assembly units captured in a sequence of images may be noticeably offset from one image to the next. To preserve a view window from a first image of a first assembly unit to a second image of a second assembly unit, the system can define a first virtual coordinate system within the first image, such as including a virtual origin and a virtual axis, and define the view window relative to this first virtual coordinate system. The system can then define a similar second virtual coordinate system in the second image, such as relative to like features of the first and second assembly units captured in these two images, and project the view window onto the second image based on the second virtual coordinate system. By defining reference coordinate systems across the set of images relative to or based on like features in assembly units represented in the set of images, the system can display these like features in the same position within the user interface, thereby enabling the user to quickly, visually distinguish differences in the relative positions of other features in these assembly units relative to these like features as the user indexes through this set of images within the user interface.

2.4.1 Manual Origin Selection

In one implementation, the system can select a global feature within the first image and define a global virtual origin within a full area of a first image in Block S220. In one example, the system: renders the first image (e.g., the whole image or an expanded subregion of the first image)

with the user interface; overlays curves on the first image in alignment with features of the first assembly unit shown in the first image; receives selection of one or more points, intersections of two curves, entire curves, etc. from the user; and then transforms the user's selection into a virtual origin and an axis of a virtual coordinate system for the first image.

While viewing the first image within the user interface, the user can initiate a new view window specification for propagation across the set of images, such as by selecting a tab or other input region within the user interface. Prior to presentation of the first image to the user or once the user initiates the new view window specification, the system can: implement edge detection and/or other computer vision techniques to identify edges of real features on the first assembly unit represented in the first image; generate a feature space laid over the first image; and populate the feature space with colored (e.g., yellow, green) vectors aligned with and representing edges of corresponding real features shown within the first image. In this implementation, the system can generate line or curve vectors representing edges of features of the first assembly unit shown in the first image; the system can also interpolate areas of features bound by three or more straight lines or one or more curves. Furthermore, the system can identify points within the first image such as ends of lines and curves, intersections of lines and curves, corners of areas, and/or centroids of areas (e.g., centers of square, rectangular, and circular areas). Once the user initiates the new view window specification, the system can activate the feature space, such as by rendering the feature space laid over the first image or by highlighting vectors within the feature space near a cursor as the user manipulates the cursor within the user interface. The system can then store the user's selection of one or more vectors from the feature space and transform these vectors into a virtual origin for the first image, as described below.

Similarly, while viewing the first image within the user interface (and after initiating the new view window specification), the user can select a pixel within the current view window. The system can then select a point, line, or curve—from the feature space specific to the first image—nearest this pixel. Alternatively, upon receipt of selection of a pixel, the system can implement methods and techniques described above to scan a region of the image around the selected pixel for edges, generate a set of vectors representing these nearby features, and then select a vector nearest the selected pixel. The system can also render this vector over the first image to indicate the particular feature. Alternatively, the system can prompt the user to select multiple (e.g., three) pixels around a feature (e.g., a point, corner, or center of an area) or along a feature (e.g., along an edge) within the first image and then implement similar methods and techniques to identify a single feature (e.g., an edge, corner, or center of an area) nearest these multiple pixels. The system can then store this feature(s) selected by the user and implement methods and techniques described below to define a virtual origin in the first image accordingly. The system can therefore: identify a set of edge features on the first assembly unit within the first subregion of the first image; receive selection of a pixel within the first subregion of the first image; select a first feature, from the set of edge features, nearest the pixel; and locate the virtual origin on the first feature. However, the system can interface with the user in any other way through the user interface to receive manual selection of a reference feature with the first image or to receive selection of a reference origin within the first image.

In this implementation, if the user selects a point feature—such as an intersection of two curves (e.g., a corner), an end of a line, or a center of a surface, either directly through the feature space or indirectly by selecting a pixel—within the first image, the system can set the virtual origin in the first image at this point feature. The system can also define an axis for the first image. For example, for the point feature that falls at the end of one line or curve in the feature space, the system can define a virtual axis intersecting the virtual origin and tangent to this line or curve. Similarly, for the point feature that falls at the intersection of two curves in the feature space (e.g., a corner), the system can define: a first virtual axis intersecting the virtual origin and tangent to the first curve; and a second virtual axis intersecting the virtual origin and tangent to the second curve. Therefore, in this example, when locating the first virtual origin in the first image, the system can also locate the first virtual origin—of a first coordinate system—on the first feature within the first image, the system can also align a first axis of the first coordinate system to the first feature. However, for the point feature located within a surface, the system can identify a nearest line (e.g., an edge) feature bounding the surface and align a virtual axis to this line feature; alternatively, the system can detect an edge feature defining a global bound (e.g., a bottom edge, a left side) of the first assembly unit and align the virtual axis to this edge feature. The virtual axis and virtual origin can thus cooperate to define a virtual coordinate system for the first image. However, the system can implement any other method or technique to place the virtual origin and virtual axis in the first image.

2.4.2 Automated Global Origin Selection

Alternatively, the system can automatically detect a reference feature on the first assembly unit shown in the first image and then define the virtual origin for the first image relative to this reference feature in Block S220.

In one implementation, the system automatically calculates a default virtual origin for images in the set. For example, the system can: implement machine vision techniques (e.g., edge detection, template matching) to detect the maximal perimeter of the first unit shown in the first image; identify the upper left corner of the maximal perimeter of the first assembly unit; define a virtual origin for the first image at this upper left corner; implement machine vision techniques to detect a straight edge nearest and/or intersecting the virtual origin; and then align a virtual axis of the virtual coordinate system to this nearest straight edge.

Similarly, the system can define a virtual origin at a feature on a fixture—restraining the first assembly unit within the optical inspection station—represented in the first image. For example, the system can: implement template matching or other object recognition techniques to detect a datum in region of the first image beyond the periphery of the first assembly unit (e.g., the fixture), such as a quick-response code, engraved real coordinate system, a set of three pins or polished steel spheres, a corner of the fixture plate, or other known optical marker on the fixture plate; and then place the virtual origin at this datum.

In another example, the system can: implement machine vision techniques to identify an upper left corner of the perimeter of a topmost rectilinear component shown in the first image (i.e., a component nearest the camera in the station at which the first image was captured); define the virtual origin of the first image at this upper left corner; implement machine vision techniques to find a nearest straight edge on the topmost rectilinear component shown in the first image; and then align the virtual axis of the virtual coordinate system of the first image to this straight edge, as shown in FIG. 3.

2.4.3 Automated Origin Selection within Zoom Window

As shown in FIG. 4, the system can implement similar methods and techniques to automatically select a feature within the first image bound by the view window and to define the virtual origin relative to this feature, such as in response to a change in the view area of the first image at the user interface. In particular, in this implementation, the system can implement similar methods and techniques to select a local feature within the region of the first image rendered within the user interface and defines a local virtual origin relative to this local feature. For example, in response to each change in zoom level and viewing position of the first image during an image viewing session, the system can recalculate a virtual origin and a virtual axis (e.g., an orientation of the virtual coordinate system) relative to a feature of the first assembly unit shown in the expanded region of the first image currently rendered within the user interface.

The system can implement methods and techniques described above to: detect edges within the first image generally or within the region of the first image currently bound by the view window; identify a set of discrete surfaces on the first assembly unit bound by these edges; select a particular discrete surface exhibiting a greatest dimension, such as a greatest area or greatest length in the set of discrete surfaces; select a feature that bounds a portion of the particular discrete surface (e.g., a longest edge of the particular discrete surface represented in the region of the first image rendered in the user interface); locate a virtual origin on this feature in the first image, such as at a topmost and/or leftmost end of this feature shown within the view window; and then align a virtual axis parallel or tangent to this feature. Alternatively, the system can: calculate a centroid of the particular surface; define the virtual origin of the first image at this centroid; detect an edge feature bounding the particular surface, and align the virtual axis to this edge feature. The system can therefore automatically place a virtual origin and a virtual axis in the first image according to a largest surface in a region of the image bound by the current view window. The system can implement similar methods and techniques to detect a surface—represented within the first image—bound by the current view window and located nearest the camera that captured the first image, as described above.

Similarly, the system can: detect a set of edge features within the region of the first image bound by the current view window; detect intersections of these edge features (i.e., "corners"); locate a virtual origin at an upper-leftmost corner detected in this region of the first image; and align a virtual axis to an edge feature intersecting this corner. Similarly, the system can locate a virtual origin at a corner nearest the center of the current view window.

The system can thus detect edge features defining bounds of parts within the first assembly unit, detect corners of these parts, and place a virtual origin at a corner of one of these parts represented within the region of the image currently rendered within the user interface, such as a largest part, a part nearest the upper-left corner of the view window, or a part at the highest elevation within a region of the first assembly unit represented in this region of the image.

Alternatively, the system can: implement computer vision techniques, such as object recognition or template matching, to identify different parts or part types within a sector of the first assembly unit represented in the region of the first image bound by the current view window; identify a common reference part or common reference part type; and then define the virtual origin for the first image relative to the common reference part or common reference part type. For example, the system can identify: an edge of a PCB; the radial center of a camera lens; a node of an antenna; and/or a fastener head or fastener bore within the region of the first image. The system can then implement methods and techniques described above and a predefined common reference part or part type hierarchy to select a highest-order part or part type, to select a feature bounding or defining this part or part type, and to define a virtual origin and virtual axis according to this feature. For example, the part type hierarchy can prioritize a fixture, then an assembly unit (e.g., an enclosure), a part (e.g., a PCB), a subpart (e.g., an integrated circuit or other chip mounted to a PCB), etc. In this example, the system can implement computing device techniques to identify features representative of these part types within the region of the first image bound by the view window and then locate the virtual coordinate system on the highest-ranking part type identified in this region of the first image according to the part type hierarchy.

In the foregoing implementation, the system can develop and revise the part or part type hierarchy over time. For example, the system can implement machine learning techniques to: track and characterize manual feature selections, as described above; detect patterns in these manual feature selections; develop a model for detecting like features in images; and refine the part or part type hierarchy to automatically select representative features in regions of images of assembly units displayed within the assembly unit over time.

However, the system can implement any other method or technique to automatically locate a virtual origin and/or a virtual axis within the first image relative to one or more features represented in the region of the first image bound by the current view window in Block S220. Furthermore, the system can toggle between setting a global virtual origin and setting a local virtual origin for a first image currently viewed by the user, such as based on a state of a virtual radio button rendered within the user interface or when the user zooms into the first image from a lowest zoom level.

2.5 View Window Specification: Last Viewed Area Parameters

Block S230 of the second method S200 recites recording a geometry and a position of the first subregion of the first image relative to the first virtual origin. Generally, in Block S230, the system records parameters characterizing the current view window on the first image relative to the virtual origin and/or virtual axis defined for the first image. In particular, the system can record a geometry and a position of the current view window—defining a region of the first image currently rendered within the user interface—relative to the virtual origin of the first image. The system can then store these data in a new view window specification.

In one implementation, as the user zooms into and out of the first image and repositions the first image vertically and horizontally in the user interface, the system can store parameters defining the last area of the first image rendered in the user interface in Block S230. For example, the system can store: the pixel width and pixel height of a rectangular region of a first image rendered in the user interface; the horizontal and vertical pixel offsets of the upper-left corner between this rectangular region and the virtual origin of the first image; and an angular offset between one edge of the rectangular region and the virtual axis of the first image in the new view window specification. In another example, the system can store the pixel coordinates of each corner of the rectangular region of the first image rendered in the user interface relative to a virtual coordinate system defined by the virtual origin and the virtual axis in the first image. The system can implement these parameters to project the view window for the first image onto other images in the set in Block S242.

The system can also write a zoom level at which the first image is currently being viewed and/or a ratio of real dimension to pixel size for the current zoom level. In Block S242, the system can implement these data to set a zoom level for other images in the set or to scale these images to match the zoom level or scale of the first image.

The system can also store a location of the feature(s) selected to define the virtual origin and the virtual axis in the first image and/or a location of a narrow feature window containing this feature(s) within the first image, such as relative to the upper-leftmost corner of the first image, relative to a datum or other reference fiducial on the fixture shown in the first image, or relative to another global origin of the first image. Similarly, the system can characterize this feature(s), such as by categorizing the feature as a corner, line, curve, arc, or surface and calculating a length, radius, or area of the feature (e.g., in pixel-based units or real units). For example, the system can store these parameters in the new view window specification. The system can then implement these parameters in Block S240 to identify like features in other images and to locate comparable virtual origins and virtual axes in these other images.

However, the system can store any other set of values representing the size and position of a region of the first image last rendered in the user interface.

Furthermore, the system can implement similar methods and techniques to locate the view window of the first image relative to a feature or set of features within the first image directly in Block S230, such as rather than relative to an origin or coordinate system located on a feature.

2.6 Second Image: Origin Selection

Block S240 of the second method S200 recites locating a second virtual origin relative to a second feature represented in a second image of a second assembly unit, wherein the second feature is analogous to the first feature. (Block S240 can similarly recite, in response to receipt of a command to advance from the first image to a second image of a second assembly unit at the user interface, locating a second virtual origin at a second feature on the second assembly unit represented in the second image, wherein the second feature on the second assembly unit is analogous to the first feature on the first assembly unit.) Generally, in Block S240, the system automatically identifies a second feature—in a second image of a second assembly unit—analogous (e.g., similar in position and geometry) to a first feature selected in the first image to define a first virtual origin and/or first virtual axes in the first image. Once this second feature in the second image is identified in Block S240, the system can define a second virtual origin and second virtual axes for the second image based on this second feature. In particular, in Block S240, when the user scrolls from the first image to the second image, the system implements methods and techniques described above to automatically identify a second reference feature in the second image substantially identical to the first reference feature selected in the first image and to automatically define a virtual origin in the second image according to this second reference feature.

In one example, the system executes Block S240 for all other images in the set, the next five images and five preceding images in the set of images, or the next image and the preceding image in the set each time the user adjusts the view window of the first image or saves a new view window specification. Alternatively, the system can execute Block S240 to identify an analogous feature in a second image once the user advances (e.g., scrolls, tabs forward or backward) from the first image to the second image.

2.6.1 Bounded Scan Area

In one implementation, the system: projects a boundary encompassing and offset from the first virtual origin of the first image onto the second image; identifies a set of edge features on the second assembly unit represented within a region of the second image contained within this boundary; identifies the second feature, in this set of edge features, exhibiting a second geometry approximately a first geometry of the first feature from the first image; and locates the second virtual origin on or relative to the second feature according to parameters implemented by the system when locating the first origin in the first image. For example, to detect the second feature in the second image, the system can: detect a global origin in the second image; project the feature window (described above) stored in the new view window specification onto the second window according to the global origin of the second image; and scan a region of the second image bounded by this feature window for a feature exhibiting a geometry similar to the geometry of the first feature of the first image.

Alternatively, the system can scan the second image in its entirety for a second feature analogous to the first feature selected in the first image.

In Block 240, the system can also detect and compare other reference features in the first and second images (e.g., lower-right corners of PCBs shown in the images), determine if the scale of the second image differs globally or locally from the first image based on relative positions of reference features in the first and second image, and then scale the second image as necessary to match a first view of the second image to a last view of the first image previously rendered in the user interface.

Alternatively, the system can identify and locate multiple analogous features across multiple images of multiple assembly units, such as in feature spaces unique to each image, prior to serving images in this set to the user interface for viewing, such as to speed a process of projecting a view area of one image onto another image—based on positions of analogous features—as the user scrolls through images in this set.

2.6.2 Analogous Feature Detection

In one implementation, the system: identifies a set of features represented in the second image (e.g., across the entire second image or within a region of the second image bounded by the feature window); selects a second feature, in the set of features, exhibiting dimensional characteristics and geometric characteristics approximating dimensional characteristics and geometric characteristics of the first feature; and then locates a second virtual origin on the second feature within the second image in Block S240. For example, the system can implement pattern matching techniques to match the second feature in the second image to the first feature in the first image. Similarly, in the implementation described above in which the system detects a first part within the first assembly unit and locates the first virtual origin on this first part in Block S220, the system can: implement computer vision techniques (e.g., template matching, object recognition) to identify a set of parts in the second assembly represented in the second image; select a second part, in the set of parts, that is analogous to the first part, such as representing a geometry and position relative to other parts in the second assembly unit that is similar to the geometry and position of the first part in the first assembly unit relative to other parts in the first assembly unit; and then locates the second virtual origin on the second features of the second part in the second image in Block S240, such as a corner of the second part similar to the corner of the first part on which the first virtual origin was located in Block S220.

In the foregoing example, the system can: implement methods and techniques to generate a second feature space for the second image; calculate a best alignment between the second feature space of the second image and the first feature space of the first image; and select the second feature—from the second feature space—that falls near the first feature in the aligned first feature space and exhibits a geometry (e.g., length and form) similar to that of the first feature.

However, the system can implement any other methods and techniques to automatically detect a second feature (e.g., a point, line, curve, or area feature) in the second image that is analogous to the first feature in the first image (i.e., the first feature by which the system located the first virtual origin and first virtual axis in the first image). The system can then replicate the process executed in Block S220 to locate the first virtual origin and the first virtual axis relative to the first feature in the first image to locate a second virtual origin and a second virtual axis (e.g., a second coordinate system) relative to the second feature in the second image in Block S240.

2.7 View Window Projection and Display

Block S242 recites projecting the geometry and the position of the first subregion of the first image onto the second image according to the second virtual origin to define a second subregion of the second image; and Block S250 recites displaying the second subregion of the second image within the user interface. Generally, in Block S242, the system selects a region of the second image to initially render within the user interface based on a set of parameters defining the last region of the first image previously rendered within the user interface. In particular, in Block S242, the system projects the last view window of the first image onto the second image based on the second virtual origin of the second image to define an analogous view window for the second image. Therefore, when the system replaces the region of the first image bound by the view window with the second image bound by the analogous view window within the user interface in Block S250, the second feature in the second image—which is analogous to the first feature in the first image—is rendered at the same location and in the same orientation within the user interface as was the first feature immediately prior. Therefore, the system can locate coordinate systems in the first and second images in Blocks S220 and S240, respectively, based on analogous reference features common to the first and second image and project a view window from the first image onto the second image in Block S242 such that the reference feature in the second image is aligned in translation and rotation with its analogous reference feature in the first image when the subregion of the second image is rendered within the user interface in replacement of the subregion of the first image in Block S250. For example, the system can render the subregion of the second image in the user interface in Block S250 substantially in real-time as the user scrolls from the first image to the second image. The system can later repeat Blocks S240, S242, and S250 as the user scrolls from the second image back to the first image or from the second image to a third image—of a third assembly unit—in the set of images.

In one implementation, the system: defines a geometry of a view window for the second image according to the zoom level stored in the new view window specification; vertically offsets an origin of the view window from the second virtual origin in the second image according to a vertical offset stored in the new view window specification; horizontally offsets the origin of the view window from the second virtual origin in the second image according to an horizontal offset stored in the new view window specification; rotates the view window relative to the second coordinate system in the second image according to an angular offset stored in the new view window specification; and defines a region of the second image bound by the new view window as the second subregion in Block S242. The system can therefore both translate and rotate the view window in the second image to align with the view window in the first image to compensate both for variations in local positions and orientations of parts within the first and second assembly units and global variations in the positions and orientations of the first and second assembly units within the optical inspection station when the first and second images were recorded. The system can then display the second subregion of the second image within the user interface in replacement of the first subregion of the first image in Block S250.

Alternatively, the system can implement similar methods and techniques to locate the view window from the first image onto a second image relative to a second feature or set of features within the second image in Block S242. However, the system can implement any other method or technique to project the view window of the first image onto the second image in Block S242 and to display the corresponding region of the second image within the user interface with the reference feature of the second image aligned to the analogous reference feature of the first image previously displayed in the user interface.

2.8 View Window Propagation

In one variation, the system serves an indicator of the second feature, the second virtual origin, and/or the second virtual axis automatically selected for the second image in Blocks S240 and S242 and a prompt to confirm these selections to the user through the user interface. Upon receipt of confirmation of these selections from the user, the system can replicate the process implemented in Blocks S240 and S242 for all other images in the set.

In one implementation, once the system automatically selects a geometry and a position of the second subregion of the second image in Block S242 and renders the second subregion of the second image within the user interface in Block S250, the system serves a prompt to confirm this geometry and position of the second subregion to the user through the user interface before executing these processes for other images in the set. If the user indicates through the user interface that this geometry and position are incorrect—such as angularly offset, shifted vertically or horizontally, or improperly scaled relative to the first subregion of the first image displayed previously—the system can: repeat Blocks S240 and S242 for the second image to recalculate the geometry and position of the second subregion of the second image; display this revised second subregion of the second image in the user interface; and similarly prompt the user to confirm the geometry and position of the revised second subregion. Upon receipt of an indication that the second subregion of the second image is improper, the system can also prompt the user to select an alternate second feature in the second image and/or indicate a preferred origin, axis, and/or coordinate system for the second image, such as by selecting an alternate pixel within the second image or selecting an alternate feature from a second feature space laid over the second image as described above. The system can then revise the second subregion of the second image and update a process for propagating the view window across the set of images, such as stored in the new view window specification, according to these additional selections entered by the user. For example, the system can implement machine learning techniques to refine a process or model for automatically selecting analogous features, locating virtual origins, and orienting virtual axes across a set of related images based on feedback provided by the user.

However, in response to receipt of confirmation of the projected geometry and the projected position of the second subregion of the second image, the system can: retrieve the set of images of other assembly units from the database as in Block S210; locate a virtual origin in each image in the set of images as in Block S240; and project the geometry and the position of the first subregion of the first image onto each image in the set of images to define a set of subregions for the set of images in Block S242. In particular, once the user confirms that the system correctly defined the second subregion in the second image, the system can propagate the last view window of the first image, such as defined in the new view window specification, across all images in the set. The system can then index through the set of subregions displayed within the user interface in response to a scroll input at the user interface as in Block S250 described above. However, the system can implement any other methods or techniques to prompt, collect, and respond to user feedback related to automatic selection of the second subregion of the second image.

As described above, the system can execute Blocks S240 and S242 for all remaining images in the set once the user confirms the second subregion of the second image, such as before the user scrolls to or selects a next image in the set. Alternatively, the system can execute the foregoing methods and techniques to propagate the last view window of the first image to images in the set in real-time as the user indexes forward and backward to these other images within the user interface.

2.9 Composite Image

One variation of the second method S200 includes Block S252, which includes virtually aligning images in the set by their coordinate systems, reducing opacities of these images, and overlaying these images to form a composite image. Generally, in this variation, the system can: virtually stack two (or more images)—from the set of images—with their analogous features or analogous-feature-based coordinate systems in alignment; reduce the opacity of these images to form a composite image; and display this composite image within the user interface. Thus, when viewing the composite image, the user may view deviations in positions and geometries of like components (e.g., housings, sub-assemblies, parts, subparts) of assembly units represented in these images related to a common reference feature.

For example, in Block S252, the system can: set a first opacity of the first subregion of the first image; set a second opacity of the second subregion of the second image; overlay the second subregion over the first subregion to generate a composite image; and display the composite image within the user interface. The system can apply a static opacity, such as 50% opacity, to each image when generating the composite image. Alternatively, the system can enable the user to dynamically adjust the opacity of images represented in the composite image and then update the composite image rendered in the display accordingly. For example, the system can: present a slider bar adjacent the composite image displayed in the user interface; adjust the first opacity of the first image according to a change in the position of a slider on the slider bar; adjust the second opacity of the second image as an inverse function of the first opacity; and refresh the composite image accordingly.

The system can implement similar methods and techniques to align and combine two or more whole images from the set of images into a composite image.

In another implementation, the system generates a composite image from an image of a real assembly unit and an image of a graphical model representing an assembly unit. In this implementation, by aligning an image of a real assembly unit to an image of the graphical model that represents the assembly unit within a single composite image and then rendering this composite image within the user interface, the system can enable the user to quickly visually distinguish differences in component positions and orientations between the real assembly unit and a nominal representation of the assembly unit defined in the graphical model. For example, the system can: retrieve a virtual three-dimensional computer-aided drafting ("CAD") model representing the first assembly unit; generate a two-dimensional CAD image of the CAD model at an orientation and in a perspective approximating the orientation and position of the first assembly unit represented in the first image; locate a third virtual origin at a third feature—analogous to the first feature on the first assembly unit—in the CAD image, such as by implementing methods and techniques similar to Block S240 described above; projecting the geometry and the position of the first subregion of the first image onto the virtual CAD model according to the third virtual origin to define a third image, such as by implementing methods and techniques similar to Block S242 described above; and then display a translucent form of the third image over the first subregion of the first image within the user interface. Thus, in this example, the system can align the CAD image to the first image in rotation and translation by a real feature on the real assembly unit represented in the first image and a graphical feature representing the real feature in the CAD model.

Alternatively, the system can implement similar methods and techniques to: generate a CAD image; project the view window from the first image onto the CAD image to define a subregion of the CAD image analogous to the first subregion of the first image; and to display the subregion of the CAD image within the user interface independently of the first image, such as when the user scrolls from the first image to the CAD image while the new view window specification is active.

2.10 One Assembly Unit at Different Assembly Stages

In one variation, the system implements similar methods and techniques to preserve a viewing window across a set of images of a single assembly unit throughout a sequence of assembly stages. For example, in Block S120, the system can assign a virtual origin to a first image based on a feature corresponding to a largest physical body shown in the first image (e.g., a corner of a PCB, a corner or perpendicular sides of a rectangular housing). In this example, the system can identify the same feature in other images of the assembly unit at various assembly stages and assign like virtual origins to these other images.

In this variation, the second method S200 can include: displaying a first image of an assembly unit in a first stage of assembly within a user interface in Block S210, the first image recorded at a first optical inspection station; locating a first virtual origin in the first image at a feature on the assembly unit represented in the first image in Block S220; in response to receipt of a zoom input at the user interface, displaying a first subregion of the first image within the user interface in Block S212; storing a geometry and a position of the first subregion of the first image relative to the first virtual origin in Block S230; identifying the feature on the assembly unit in a second image of the assembly unit in a second stage of assembly in Block S240; locating a second virtual origin in the second image according to the feature in Block S240; defining a second subregion of the second image based on the geometry and the position of the subregion of the first image and the second virtual origin in Block S242; and, in response to receipt of a command to advance from the first image to the second image at the user interface, displaying the second subregion of the second image within the user interface in Block S250.

For example, the system can: retrieve a first digital photographic image—recorded by a first optical inspection station at a first position along an assembly line—of the first assembly unit from a database; normalize the first digital photographic image to form the first image, as described above; retrieve a second digital photographic image—recorded by a second optical inspection station at a second position along the assembly—of the first assembly unit; and normalize the second digital photographic image to form the second image. The system can then implement methods and techniques described above to define analogous subregions of the first and second images (and other images of the first assembly unit) and to sequentially display these subregions as the user indexes through these images.

In particular, in this variation, the system can implement methods and techniques described above to display expanded views of the same physical position of a single assembly unit from a sequence of images recorded at various stages of the assembly unit's assembly. By aligning images of one assembly unit at different stages of assembly by a common feature and sequentially displaying these images in the user interface responsive to scroll or index inputs entered by the user, the system can enable the user to view changes to the assembly unit over time (e.g., along the assembly line) with a view window of these separate images locked to a common reference feature contained in these images.

2.10.1 Obscured Alternate Reference Features

In this variation, if a reference feature selected in a first image to define a virtual origin in the first image is not visually available in a second image of the same unit, such as due to obscuration by a component installed on the assembly unit between capture of the first image and capture of the second image, the system can: select an alternate feature on the assembly unit that is visually available in both the first and second images when as the user scrolls from the first unit to the second unit; and then redefine virtual origins (or assign secondary or backup virtual origins) for the first and second images of the assembly unit.

In particular, the system can: align a first image (or a subregion of the first image) of the assembly unit to a second image (or a subregion of the second image) by one common feature represented in both the first and second images; locate a third virtual origin in the second image at a second feature on the assembly unit represented in the second image; store a geometry and a position of the second subregion of the second image relative to the third virtual origin; identify the second feature on the assembly unit in a third image; locate a fourth virtual origin in the third image according to the second feature; define a third subregion of the third image based on the geometry and the position of the second subregion of the second image and the fourth virtual origin; and display the first, second, and third subregions of the first, second, and third images as the user advances through the assembly stages of the assembly unit at the user interface. For example, the system can align a first subregion of a first image to a second subregion of a second image by a corner of a PCB within the assembly unit shown in both the first and second subregions of the first and second image. In this example, an enclosure is installed on the assembly unit prior to recordation of a third image, thereby obscuring the PCB. Thus, to align the third image to the second image, the system can detect an edge of an housing of the assembly unit shown in both the second and third images and align the second and third images according to the edge of the housing.

2.10.2 Transparent Composite View

In this variation, the system can implement methods and techniques described above to compile two or more images (or subregions of two or more images) of one assembly unit at different assembly stages into a single composite image. For example, the system can: set a first opacity of a first subregion of a first image of the assembly unit at a first assembly stage; set a second opacity of a second subregion of a second image of the assembly unit at a second (e.g., later) assembly stage; align the first and second subregions of the first and second images by a common feature of the assembly unit represented in both the first and second subregions; merge the first and second subregions into a composite image; and then display the composite image within the user interface. In this example, the system can compile multiple (e.g., all) images of one assembly unit into a static composite image and render this within the user interface. Alternatively, the system can compile these images into a dynamic composite image. For example, the system can initially display the composite image with a first image of the assembly unit in a first assembly state shown at 100% opacity and all other images at 0% opacity; as the user scrolls through the composite image, the system can decrease the opacity of the first image and increase the opacity of a second image of the assembly unit in a second assembly state; once the second image is shown at 100% opacity and as the user continues to scroll through the composite image, the system can decrease the opacity of the second image and increase the opacity of a third image of the assembly unit in a third assembly state; etc. until a last image a set of images of the assembly unit is shown at full opacity.

3. Optical Measurement

Figure 6:
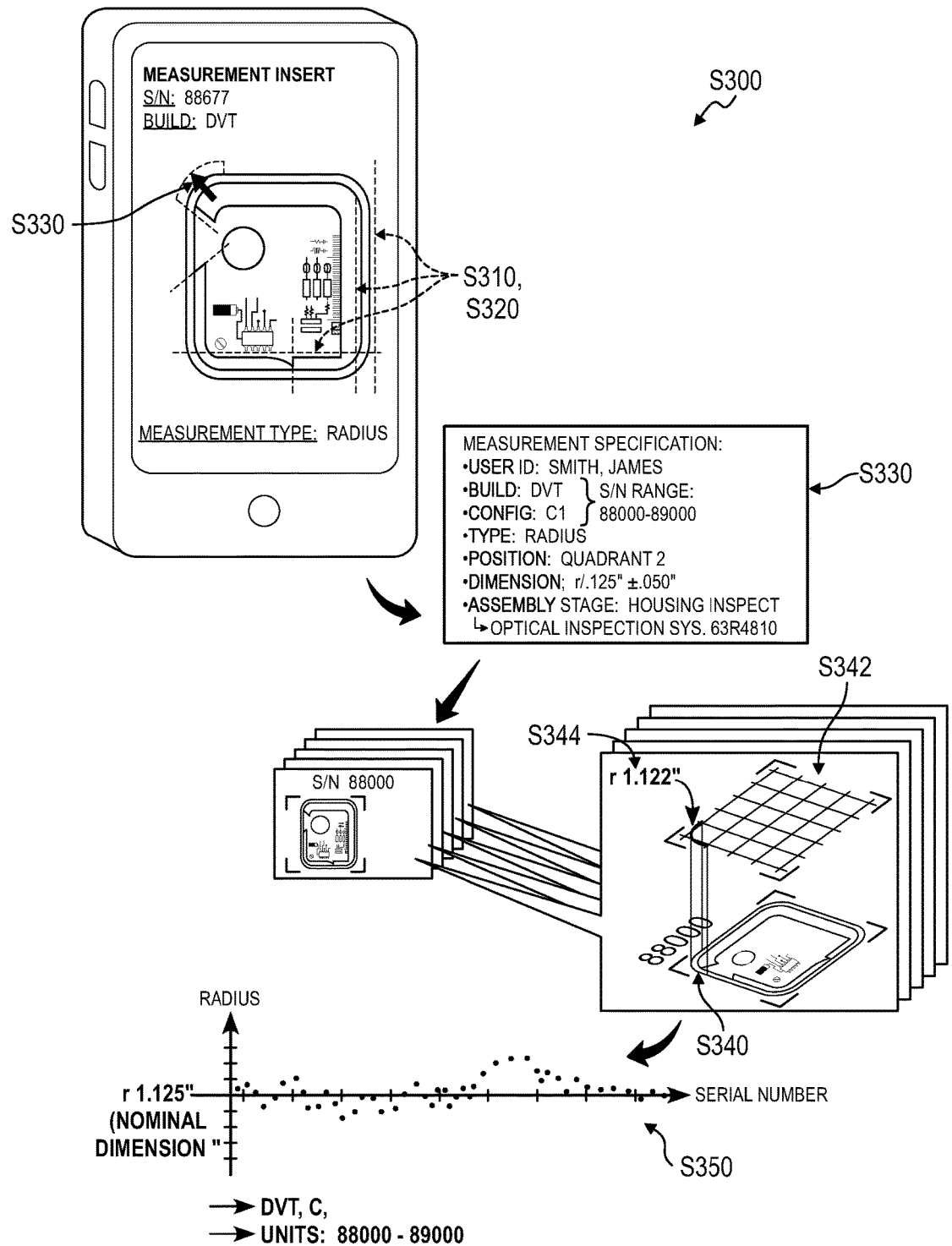
FIG. 6 is a flowchart representation of a third method.
Figure 7:
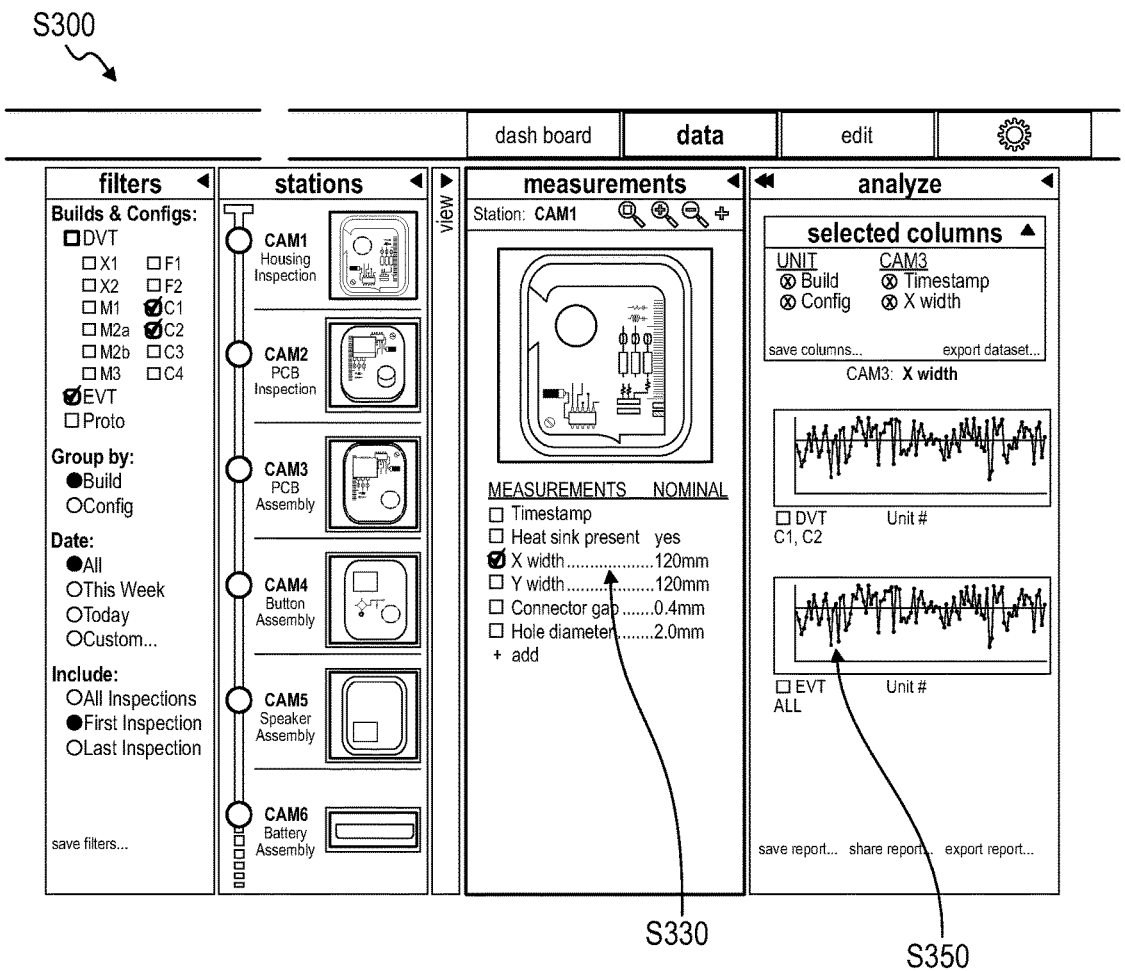
FIG. 7 is a graphical representation of one variation of the third method.
Figure 8:
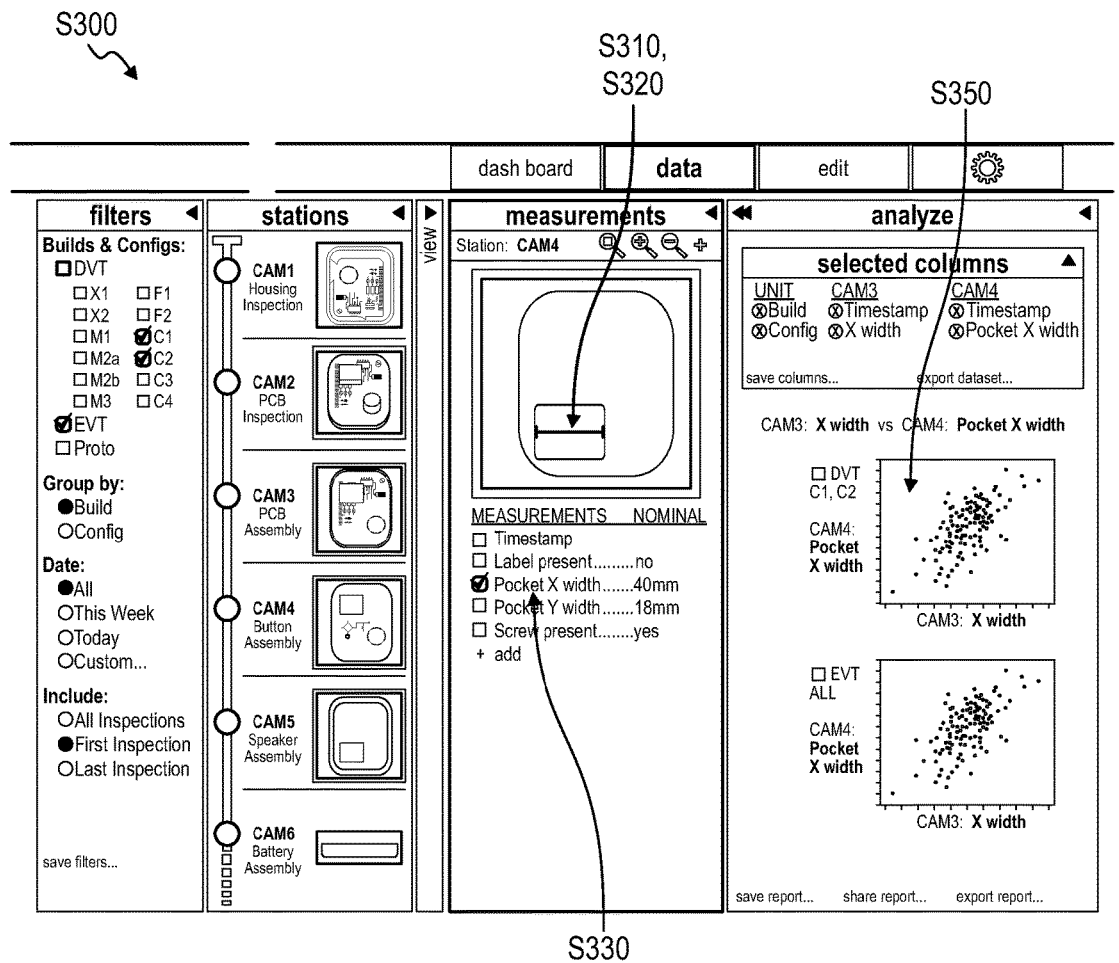
FIG. 8 is a graphical representation of one variation of the third method.

As shown in FIG. 6, a third method S300 for automatically generating a common measurement across multiple assembly units includes: detecting a first set of features in a first assembly unit shown in a first image captured by an optical inspection station in Block S310; at a user interface, displaying the first image and a set of curves over the set of features in the first image in Block S320; and generating a measurement specification for a particular feature in assembly units imaged by the optical inspection station based on a curve manually selected from the set of curves within the user interface in Block S330. The third method S300 also includes, for each image in a set of images captured by the optical inspection station (the set of images including the first image): identifying the particular feature in an assembly unit shown within the image based on the measurement specification in Block S340; mapping a distorted measurement space onto the image in Block S344; and calculating a real dimension of the particular feature based on the geometry of the feature within the distorted measurement space in Block S344. Finally, the third method S300 can include generating a graphical plot of real dimensions of the particular feature in assembly units imaged by the optical inspection station in Block S350, as shown in FIGS. 7 and 8.

One variation of the third method S300 for automatically generating a common measurement across multiple assembly units includes: displaying a first image within a user interface in Block S320, a form of the first image recorded at an optical inspection station; receiving manual selection of a particular feature in a first assembly unit represented in the first image in Block S310; receiving selection of a measurement type for the particular feature in Block S330; and extracting a first real dimension of the particular feature in the first assembly unit from the first image according to the measurement type in Block S344. The third method S300 also includes, for each image in a set of images: identifying a feature in an assembly unit represented in the image in Block S340, the feature in the assembly unit analogous to the particular feature in the first assembly unit; and extracting a real dimension of the feature in the assembly unit from the image according to the measurement type in Block S344. The third method S300 further includes aggregating the first real dimension and a set of real dimensions extracted from the set of images into a digital container in Block S350.

Another variation of the third method S300 includes retrieving a set of images in Block S310 and, for a first image in the set of images: displaying the first image within a user interface, a form of the first image recorded at an optical inspection station, and displaying the first real dimension with the first image within the user interface in Block S320; receiving manual selection of a particular feature in a first assembly unit represented in the first image in Block S310; determining a measurement type for the particular feature in Block S330; and extracting a first real dimension related to the particular feature in the first assembly unit from the first image according to the measurement type. The third method S300 also includes, for a second image in the set of images: automatically identifying a second feature in a second assembly unit represented in the second image in Block S340, the second feature in the second assembly unit analogous to the particular feature in the first assembly unit; and extracting a second real dimension related to the second feature in the second assembly unit from the second image according to the measurement type in Block S344. In this variation, the third method S300 further includes, for a third image in the set of images: automatically identifying a third feature in a third assembly unit represented in the third image in Block S340, the third feature in the third assembly unit analogous to the particular feature in the first assembly unit; and extracting a third real dimension related to the third feature in the third assembly unit from the third image according to the measurement type in Block S340. The third method S300 also includes: in response to selection of the second image at the user interface, displaying the second image and the second real dimension within the user interface in Block S320; and, in response to selection of the third image at the user interface, displaying the third image and the third real dimension within the user interface in Block S320.

3.1 Applications

Generally, the system can execute Blocks of the third method S300: to receive, from a first image of a first unit, a selection of a real feature in the first unit shown; to define a call to calculate a real dimension (e.g., length, radius, parallelism, etc.) of the feature from the first image; to propagate the call across other images of similar units; and to automatically calculate real dimensions of like features across multiple like units from corresponding images of the assembly units. The system can then assemble these real dimensions of one feature type from multiple units into a graphical plot, histogram, table, trend line, or other graphical or numeric representation of real dimensions of the feature across the group of units. The system also calculates a real dimension of a feature in a unit by implementing machine vision techniques (e.g., edge detection) to identify the feature in an image of the assembly unit, mapping a two- or three-dimensional measurement space to the image in order to compensate for optical distortion in the image, and then calculates a real dimension of the feature based on its position in the image relative to the measurement space.

The system can therefore execute Blocks of the third method S300 to retroactively and automatically configure measurement of a batch of units from images of the assembly units after the images are captured, thereby eliminating a need to configure optical inspection stations on an assembly line before assembly of units on the line. The system can also execute Blocks of the third method S300 to enable one or more users to create and access new measurements of real unit features from old images of units without necessitating that new images of the assembly units be captured and without necessitating manual selection of the same feature for measurement across images of multiple like units. The system can similarly execute Blocks of the third method S300 in real-time, such as locally at an optical inspection station, in a remote server, or on a user's computing device (e.g., smartphone).

Blocks of the third method S300 can be executed locally by a computing device, such as a smartphone, tablet, or desktop computer. The system can include a display and render a user interface on the display to receive selection of a feature for measurement in an image and to present real dimension results to the user. Blocks of the third method S300 can additionally or alternatively be executed by a remote computer system, such as a remote server, that interfaces with a local computing device (e.g., a smartphone, tablet, or desktop computer) to receive selection of a feature for measurement in an image and to present real dimension results to the user. However, any other local or remote computing device, computer system, or computer network (hereinafter "system") can execute Blocks of the third method S300.

The third method S300 is described herein as implemented by the system to propagate a measurement specification for a dimensional value (e.g., length, radius, parallelism, etc. in metric or Imperial units). However, the third method S300 can additionally or alternatively be implemented to define a part-present specification, to propagate the part-present specification across images of multiple units, and to confirm that a component specified in the part-present specification is or is not present in each image. Similarly, the third method S300 can be implemented to define a text specification, a color specification, a category of a marking (e.g. production lot code) specification, or a specification of any other type, to propagate these specifications across images of multiple units, and to confirm that a text string, a color, a marking, or other feature specified in the part-present specification is or is not present in each image.

3.2 Images

Block S320 of the third method S300 recites displaying a first image within a user interface. Generally, in Block S320, the system can implement methods and techniques described above in Block S210 to retrieve a first image from a database and to present the first image to a user through the user interface.

As described above in Block S210, the system can also: normalize (or "flatten," "dewarp") the first image and other images stored in a database (or "body") of images; aggregate a set of related images, such as images of various assembly units of the same type and in the same assembly state or a set of images representing the first (i.e., a single) assembly unit in various stages of assembly.

3.3 Feature Selection

Block S310 of the third method S300 recites receiving manual selection of a particular feature in a first assembly unit represented in the first image. Generally, in Block S310, the system interfaces with the user through the user interface to receive a selection of a particular feature or set of features from which the system subsequently extracts a dimension in Block S344.

3.3.1 Feature Space and Vector-Based Selection

In one implementation, the system: implements computer vision techniques to identify features of the first assembly unit represented in the first image; generates a feature space containing vectorized points, lines, curves, areas, and/or planes representing these features; and overlays the first image with this feature space, as described above. In particular, when an image of a unit captured by an optical inspection station is selected by a user for insertion of a measurement, the system can implement machine vision techniques to automatically detect features of the assembly unit shown in the first image in Block S310. For example, the system can implement edge detection techniques to identify corners (e.g., points), edges (e.g., lines, curves), and surfaces (e.g., areas, planes) in the first image. In Block S320, to guide the user in selecting one or more features in the first image for measurement, the system can: generate the feature space—specific to the first image—that contains vectorized points, curves, areas, and/or planes aligned to points, lines, and surfaces detected in the first image; and then render the first image and the feature space laid over the first image in the user interface, as shown in FIG. 6. The system can then receive manual selection of a particular vector (or a set of vectors) from the first set of vectors contained in the first feature space from the user via the user interface and then identify the particular feature (or set of features) corresponding to the particular vector(s) selected by the user.

3.3.2 Pixel-Based Feature Selection

Alternatively, the system can interface with the user interface to receive selection of a pixel from the first image and to implement methods and techniques described above to select a particular feature—from a set of features—in the first image nearest or otherwise corresponding to this pixel. For example: while viewing the first image within the user interface, the user can navigate a cursor to a pixel near a desired corner feature, near a desired edge feature, or on a desired surface and select this pixel; as described above, the system can then compare this pixel selection to a feature space specific to the first image to identify a particular feature nearest the selected pixel.

As described above, the system can also prompt the user to select multiple pixels nearest a desired corner, along a desired edge, or on a desired surface represented in the first image; the system can then compare these selected pixels to the feature space to select a corner, line (or curve), or area that best fits the set of selected pixels. However, the system can interface with the user through the user interface in any other way to receive a selection of a particular feature from the first image in Block S310. The system can implement similar methods and techniques to receive selections of multiple distinct features from the first image, as described below.

The system can implement subsequent Blocks of the third method S300 to define a measure specification for the set of images based on this feature(s), to extract a real dimension of this feature from the images, and to populate this measurement specification across other images in the set.

3.4 Measure Specification

Block S330 of the third method S300 recites receiving selection of a measurement type for the particular feature. Generally, in Block S330, the system generates a measurement specification defining a measurement type for the feature(s) selected in Block S310 and characterizing the particular feature(s) selected from the first image.

As described above, the system can receive selection of one or more vectorized curves in the feature space from the user. For example, from vectorized curves contained in the feature space overlaid on the first image, the user can select a vectorized point, an intersection of two vectorized curves, a single vectorized curve, two non-intersecting vectorized curves, or an area enclosed by one or more vectorized curves. The system can populate a measurement type menu within the user interface with various measurement types, such as distance (e.g., corner-to-corner), length (e.g., end-to-end or edge length), radius (or diameter), planarity, parallelism, circularity, straightness, line profile, surface profile, perpendicularity, angle, symmetry, concentricity, and/or any other measurement type for the particular feature(s) in the first image; the user can then select a measurement type for the selected points, intersections, curves, and/or areas in the feature space from this menu.

Based on the type(s) of features selected by the user, the system can also filter, order, and/or suggest a measurement type in a set of supported measurement types. For example, upon selection of a single line (e.g., a substantially straight curve) in Block S310, the system can predict a length-type measurement and can enable a length-type measurement type in the menu of measurement types accordingly. Upon selection of an arc in Block S310, the system can enable a total arc length measurement, a radius measurement, and a diameter measurement in the menu of measurement types. Upon selection of an area in Block S310, the system can enable a total area measurement and a circumference measurement in the menu of measurement types. Upon selection of a point and a curve in Block S310, the system can enable a nearest distance measurement and an orthogonal distance measurement in the menu of measurement types. Upon selection of a first curve and a second curve in Block S310, the system can enable a nearest distance measurement, an angle measurement, and a gap profile measurement (e.g., a gap distance as a function of length along the first and second curves) in the menu of measurement types. Upon selection of three points in Block S310, the system can enable a measurement for calculating a smallest circle formed by the three points in the menu of measurement types. However, the system can support any other predefined or user-defined (e.g., custom) measurement type. The system can also receive a selection for a measurement type or automatically predict a measurement type for the particular feature(s) in any other way.

From the particular feature(s) (e.g., an original feature in the first image or a vectorized point, curve, and/or area, etc. in the feature space specific to the first image) selected from the first image, the system can generate a measurement specification for the set of images in Block S330. For example, in Block S330, the system can define a feature window containing the particular feature in the first image and store this position and geometry of the feature window (e.g., relative to an origin of the first image or relative to the upper-left corner of the first image) in the measurement specification; as shown in FIG. 6, the system can project this feature window onto other images in the set in Block S340 to identify features—analogous to the particular feature selected from the first image—in these other images in the set. In particular, when processing the set of images according to the measurement specification in Block S340, the system can project the feature window onto each image in the set and can then scan regions of these images bound by the feature window for features analogous to the feature(s) selected in Block S310. In this implementation, the system can implement methods and techniques described above in the second method S200 to align the feature window defined at the first image to other images in the set.

The system can also characterize the particular feature and store this characterization in the measurement specification. For example, the system can: implement template matching or pattern recognition techniques to characterize the particular feature as one of an arc, spline, circle, or straight line; write this characterization of the particular feature to the measurement specification in Block S330; and apply this characterization to other images in the set to identify features of the same type in these other images in Block S340. The system can also: calculate a real or pixel-based dimension of the particular feature; store this dimension in the measurement specification; and detect analogous features—in the remaining images in the set—that exhibit similar real or pixel based dimensions, such as within a tolerance of ±2% in Block S344. Similarly, the system can: prompt the user to enter a nominal dimension and a dimensional tolerance for the nominal dimension for the particular feature(s), as shown in FIGS. 7 and 8; or extract the nominal dimension and dimensional tolerance from a CAD model of the first assembly unit, as described below; and identify features in other images in the set that are analogous to the particular feature based on the nominal dimension of the feature.

Figure 9A:
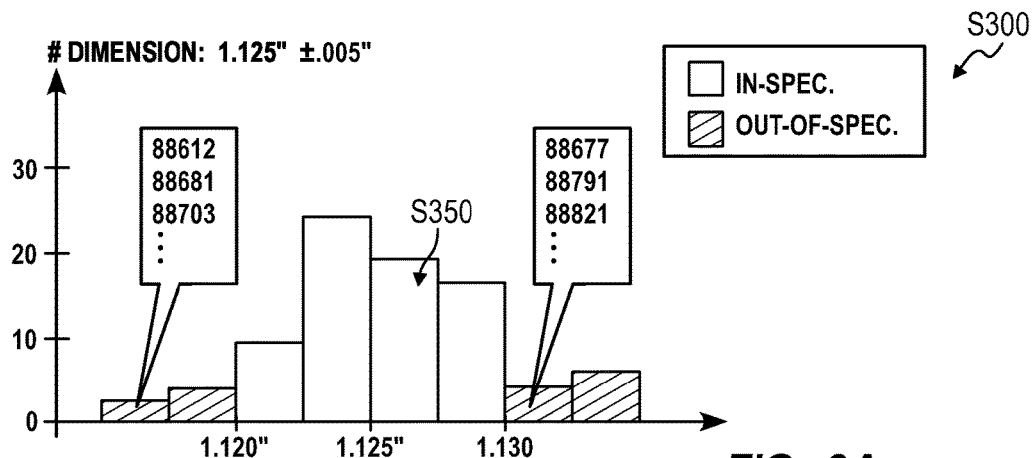
FIGS. 9A, 9B, and 9C are graphical representations of variations of the third method.

The system can also prompt the user to enter a name of the measurement (e.g., "antenna_height_1"), a description of the measurement (e.g., "antenna height"), tags or search terms for the measurement (e.g., "John_Smiths_measurement_set," "RF group," "DVT" or "EVT", etc.), and/or other textual or numerical data for the measurement. The system can then store these data in the measurement specification, as shown in FIGS. 6 and 9C. For example, the system can enable the user to toggle such tags within the user interface to access and filter points represented in a graph or chart of real dimensions of analogous features read from images in the set according to the measurement specification. Similarly, the system can enable another user to search for this measurement specification by entering one or more of these tags or other terms through a search window in another instance of the user interface in order to access this measurement specification for this set of images or to access this measurement specification for application across another set of images. The system can therefore enable multiple users: to apply general, group-specific, and/or user-specific measurement specifications across various sets of images; to access data extracted from a set of images according to a general, group-specific, and/or user-specific measurement specification; and to access measurement specifications configured by other users.

However, the system can collect any other related information from the user or extract any other relevant data from the first image to generate a measurement specification for the set of images in Block S330. The system can then apply the measurement specification across images in the set in Blocks S340 and S344 to identify analogous features in assembly units represented in these images and to extract real dimensions of these analogous features directly from these images.

3.5 Analogous Feature Detection

Block S340 of the third method S300 recites, for each image in a set of images, identifying a feature—analogous to the particular feature in the first assembly unit—in an assembly unit represented in the image. (Block S340 can similarly recite identifying a second feature in a second assembly unit represented in the second image, the second feature in the second assembly unit analogous to the particular feature in the first assembly unit.) Generally, in Block S340, the system: scans an image in the set of images for a feature analogous to the particular feature selected from the first image, such as a feature located in a similar position and exhibiting a similar geometry (e.g., real or pixel-based dimension, feature type) as the particular feature selected from the first image, such as by implementing methods and techniques described above in the second method S200; and repeats this process for remaining images in the set to identify a corpus of analogous features in assembly units represented across the set of images. The system can then extract real dimensions of these features directly from these images in Block S344 and assemble these dimensions into a graph, chart, or statistic representing dimensional variations of like features (e.g., lengths, width, radii of parts; relative positions of parts; gaps between parts; etc.) across this set of assembly units.

To calculate real dimensions of analogous features across a set of images of assembly units at the same or similar assembly stage in one or more builds according to a single measurement specification configured by the user, the system can scan each image in the set of images for a feature analogous (e.g., substantially similar, equivalent, corresponding) to the feature selected by the user and specified in the measurement specification. For example, for each image selected for calculation of a real dimension according to the measurement specification, the system can implement methods and techniques described above to detect features in an image and then select a feature in the image that best matches the relative size, geometry, position (e.g., relative to other features represented in the image), color, surface finish, etc. of the particular feature selected from the first image and specified in the measurement specification in Block S340. The system can then calculate a dimension of the analogous feature for each image in the set in Block S344, as described below.

3.5.1 Window Scan

In one implementation, the system: defines a feature window encompassing the particular feature, offset from the particular feature, and located according to an origin of the first image; and stores the feature window in the measurement specification, as described above in Block S330 described above. For example, the system can define the feature window relative to a global origin of the image (e.g., an upper-left corner of the first image). Alternatively, the system can implement computer vision techniques to detect the perimeter of the first assembly unit in the first image, define an origin on the first assembly unit in the first image (e.g., at an upper-left corner of the first assembly unit), and define a location of the feature window relative to the assembly-unit-based origin. The system can also implement a preset offset distance (e.g., 50 pixels) and define the geometry of the future window that encompasses the particular feature and is offset from the particular feature by the preset offset distance. For example, for the particular feature that defines a corner, the system can define a circular feature window 100 pixels in diameter; for the particular feature that defines a linear edge, the system can define a rounded rectangular feature window 100 pixels wide with corners exhibiting 50 pixels in radius and offset from near ends of the linear edge by 50 pixels.

The system can then locate the feature window within an image according to a global origin of the image (e.g., an upper-left corner of the image). Alternatively, the system can repeat the process described above to define an assembly-unit-based origin within the image and to locate the feature window in the image according to this assembly-unit-based origin. The system can then: scan a region of the image bound by the feature window to identify a limited set of features in the image; and compare geometries and sizes of features in this limited set of features to the characterization of the particular feature stored in the measurement specification to identifying one feature in the image best approximating (e.g., "analogous to") the particular feature from the first image. The system can repeat this process for each remaining image in the set of images.

3.5.2 Feature Matching in Feature Spaces

In another implementation, the system generates a first feature space for the first image in Block S310, labels a particular vector representing the particular feature in the first feature space, and stores the first feature space in the measurement specification in Block S330. The system can then implement similar methods and techniques to identify a set of features in an image in the set of images and to generate a feature space containing a set of vectors representing this set of features in the image. The system can then: align the feature space of the image to the first feature space of the first image; identify a vector in the set of vectors nearest the particular vector in the first set of vectors in location and geometry; and label the feature in the image corresponding to the vector as analogous to the particular feature in the first image. The system can repeat this process for each remaining image in the set of images.

However, the system can implement any other method or technique to identify like features—of assembly units represented in the set of images—that are analogous to the particular feature of the first assembly unit selected from the first image. Furthermore, the system can repeat the foregoing processes for each of multiple distance features selected from the first image in Block S310.

3.5.3 Feature Confirmation

In one variation, the system implements methods and techniques described above to receive confirmation from the user that its identification of a second feature—in a second image in the set of images—is analogous to the particular feature selected from the first image before repeating this process to identify analogous features in other images in the set. For example, once the measurement specification is defined in Block S330, the system can: execute a feature selection routine to identify a second feature in the second image predicted to be comparable (i.e., analogous) to the particular feature selected from the first image; and store steps of this feature selection routine or a characterization of the feature selection routine in memory (e.g., in the measurement specification). Before repeating the feature selection routine for other images in the set, the system can: display the second image within the user interface; indicate the second feature within the second image; and prompt the user—through the user interface—to confirm that the second feature is analogous to the particular feature. If the user indicates that the second feature is incorrect, the system can repeat the feature selection routine to select an alternate feature from the second image and repeat this process until the user indicates that the correct feature was selected. The system can additionally or alternatively prompt the user to manually indicate the correct feature in the second image, and the system can update the feature selection routine accordingly. However, in response to receipt of manual confirmation of the second feature as analogous to the particular feature from the user via the user interface, the system can: execute the feature selection routine at a third image in the set to identify a third feature—analogous to the particular feature—in the third image; and execute the feature selection routine at other images in the set to identify analogous features in these other images.

3.6 Measurement Propagation

Block S344 of the third method S300 recites: extracting a first real dimension of the particular feature in the first assembly unit from the first image according to the measurement type; and, for each image in a set of images, extracting a real dimension of the feature in the assembly unit from the image according to the measurement type. Generally, once like features are identified in each image in the set of images in Blocks S310 and S340, the system extracts dimensions of each of these features directly from their corresponding images.

Furthermore, once a dimension of a feature is extracted from an image of an assembly unit, the system can render an indication of the feature and its dimension within the user interface, such as over the image or adjacent the images. In particular, in response to selection of a first feature from a first image at the user interface, the system can display a first real dimension of the first feature with (e.g., on or adjacent) the first image within the user interface; in response to selection of a second image of a second assembly unit at the user interface, the system can display both the second image and a second real dimension of a second feature—analogous to the first feature—within the user interface; etc.

3.6.1 Real Dimension from Original Image

In one variation, the system: projects a dimension space onto the first ("flattened") image; extracts the first real dimension of the particular feature from the first image based on a position of the particular feature relative to the dimension space and the measurement type; and repeats this process for other images in the set.

In this implementation, the system can flatten an original digital photographic image of the first assembly unit and present the flattened first image to the user through the user interface for selection of the particular feature. Once the particular feature is selected, the system can project the particular feature from the flattened first image onto the first digital photographic image to identify the particular feature in the original digital photographic image. The system can then map a distorted measurement space onto the first digital photographic image in preparation for extracting a real dimension of the particular feature from the digital photographic image. Generally, in this variation, in order to precisely (i.e., accurately and repeatably) calculate a real dimension of a feature of an assembly unit represented in a flattened image, the system can project a distorted measurement space onto the corresponding digital photographic image and extract a dimension of the feature from the digital photographic image based on a position of the feature relative to the distorted measurement space. In particular, rather than extract a real dimension from a flattened image, which may result in loss of data over the original digital photographic image, the system can map a distorted measurement space onto the corresponding digital photographic image in order to compensate for optical distortion (e.g., perspective distortion) in the digital photographic image while also preserving data contained in the image.

In one implementation, the system generates a virtual measurement space representing a plane in real space at a particular distance from a camera in the optical inspection station that recoded the digital photographic image but "warped" (i.e., "distorted") in two or three dimensions to represent optical distortion in the digital photographic image resulting from optics in the camera. In one example, after capturing a digital photographic image of an assembly unit, an optical inspection station can tag the digital photographic image with a zoom level, focus position, aperture, ISO, and/or other imaging parameters implemented by the optical inspection station at the instant the digital photographic image was recorded. In this example, to calculate a dimension of a feature in the digital photographic image, the system can: extract these imaging parameters from metadata stored within the digital photographic image; calculate a reference plane on which the real feature of the assembly unit occurs in real space relative to the real reference (e.g., a fiducial on the optical inspection station); and then generate a virtual measurement space containing a set of X and Y grid curves offset by a virtual distance corresponding to a known real distance on the real reference plane based on the imaging parameters stored with the digital photographic image, as shown in FIG. 6. The system can then calculate the length, width, radius, etc. of the feature shown in the digital photographic image by interpolating between X and Y grid curves in the virtual measurement space overlaid on the digital photographic image.

In the foregoing example, the system can select a pixel or a cluster of pixels at each end of a feature—analogous to the particular feature—in the digital photographic image, project the pixels onto the warped measurement layer, interpolate the real position of each projected pixel or pixel cluster based on its position relative to X and Y grid curves in the measurement space, and then calculate the real length of the feature (or distance between two features) in the real unit based on the difference between the interpolated real positions of the pixels or a cluster of pixels. In this example, the system can select a pixel or a cluster of pixels at each end of a feature—corresponding to a feature defined in the measurement specification—in the digital photographic image, generate a virtual curve—representing a real straight line in the measurement space and passing through the pixels or a cluster of pixels, and then calculate a straightness of the feature in the assembly unit from variations between pixels corresponding to the feature in the digital photographic image and the virtual curve in the measurement space. The system can therefore generate a warped measurement layer from a standard calibration grid, based on calibration fiducials in a digital photographic image, or based on any other generic, optical inspection station-specific imaging, or digital photographic image-specific parameter.

However, the system can generate a measurement layer (or multi-dimensional measurement space) of any other form in Block S344 and can apply this measurement layer to a digital photographic image in any other way in Block S344 to calculate a real dimension of a feature on the assembly unit according to parameters defined in the measurement specification. The system can also render a virtual form of the measurement layer, such as in the form of a warped grid overlay, over a corresponding digital photographic image when rendered with the user interface.

3.6.2 Real Dimension from Dewarped Image

In another implementation, the system extracts real dimensions directly from flattened images (described above). For example, when calculating an homography transform for flattening digital photographic images recorded at an optical inspection station, such as based on a reference image recorded at the optical inspection station, the system can calculate a scalar coefficient that relates a length of a digital pixel in a flattened image to a real dimension (i.e., a length value in real space), as described above. To extract a real dimension of a feature from an image in Block S344, the system can: count a number of pixels spanning the feature; and multiply this number of pixels by the scalar coefficient to calculate a real dimension of this feature. However, the system can implement any other methods or techniques to extract a real dimension of a real feature on an assembly unit from a flattened image of the assembly unit. The system can implement these methods and techniques for each image in the set of images to calculate real dimensions of like features across the set.

(The system can additionally or alternatively implement methods and techniques described herein to calculate a dimension of an assembly unit solely in one image of an assembly unit based on a measurement specification (e.g., rather than propagate the measurement specification across all or a subset of images). For example, the system can implement these methods and techniques to calculate a one-time measurement based on a pixel-to-pixel selection entered by a user onto a single image.)

3.7 Access and Analytics

Block S350 of the third method S300 recites aggregating the first real dimension and a set of real dimensions extracted from the set of images into a digital container (e.g., a virtual visual representation or digital file). Generally, in Block S350, the system aggregates real dimensions of like (e.g., analogous) features extracted from the set of images—representing a set of assembly units—into a visual or statistical (e.g., numerical) representation of variations in this feature across the set of assembly units.

3.7.1 Graphs and Charts

In one implementation, the system can compile real measurement values—of like features in assembly units represented across the set of images—into a graphical plot. For example, the system can aggregate the set of real dimensions into a virtual histogram including a set of discrete percentile ranges (e.g., 0-10%, 10-20%, 20-30%, etc.) spanning the set of real dimensions and then render the virtual histogram within the user interface, as shown in FIG. 9A. In this example, in response to selection of (or placement of a cursor over) a particular percentile range, in the set of discrete percentile ranges, the system can retrieve an exemplary image—in the set of images—representative of the particular percentile range and render the exemplary image over or next to the virtual histogram within the user interface.

Figure 9B:
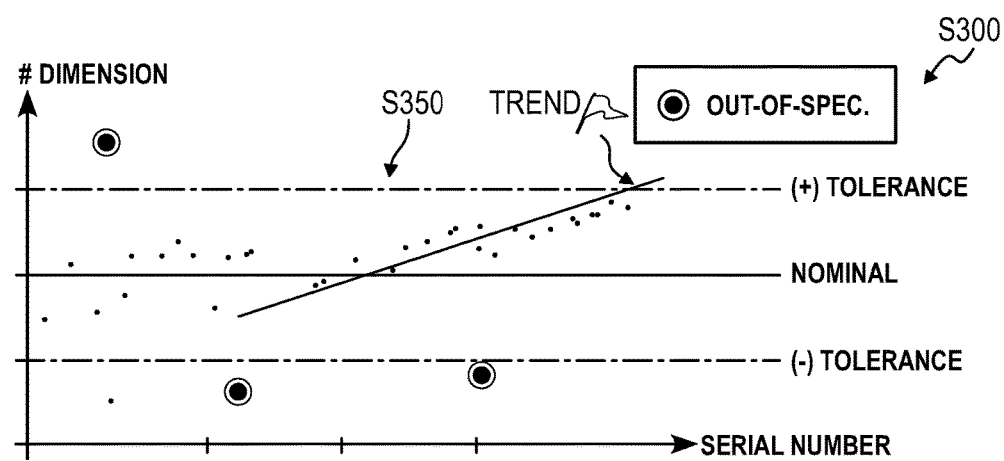
Figure 9C:
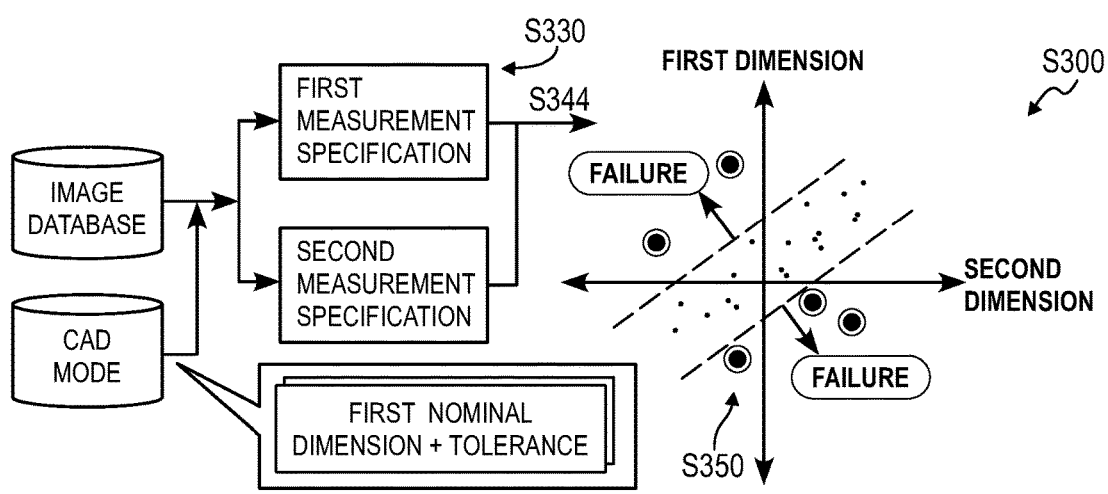

In another implementation, the system can: transform the set of real dimensions into a plot of real dimension versus time (e.g., time and digital photographic image of an assembly unit as recorded along an assembly line) or versus serial number, as shown in FIG. 9B; and then display this plot within the user interface. The system can also calculate a trendline or line of best-fit for this plot and predict deviations from the nominal dimension of the feature—beyond the dimensional tolerance—based on this trendline. For example, the system can execute the foregoing methods and techniques substantially in real-time as assembly units are assembled along an assembly line and as digital photographic images of these units are received from an optical inspection station arranged along the assembly line. In this example, the system can: generate a plot of real dimensions of the particular feature—across the series of assembly units—versus serial number based on data extracted from these images; and (re)calculate a trendline for the plot following receipt of each additional digital photographic image from the optical inspection station. If the trendline exhibits a positive slope (per unit time or per assembly unit) exceeding a threshold slope (e.g., once a threshold number of images of assembly units have been processed), the system can automatically generate a flag for the assembly line and prompt the user (or other engineer or entity affiliated with the assembly line) to review processes related to the corresponding feature at the assembly line in order to preempt deviation of this particular feature from the assigned dimension beyond the dimensional tolerance. The system can therefore extract dimensions of a particular feature from images, extrapolate trends in dimensions of this particular feature, and selectively prompt the user or other entity to investigate an assembly line in (near) real-time in order to achieve improved yield from the assembly line.

In the foregoing implementation, the system can interface with the user through the user interface to configure a measurement specification for an assembly unit type or assembly line before any assembly units are assembled or imaged at the assembly line. For example, the system can: retrieve a three-dimensional CAD model of an assembly unit, as described above in the second method S200; display a two- or three-dimensional CAD image of the CAD model within the user interface in Block S320; receive a user selection of the particular feature directly from a CAD image in Block S310; and configure a measurement specification for the particular feature in Block S330 based on this selection and other data (e.g., nominal dimension and dimensional tolerance of the particular feature, feature type, assembly type and configuration, etc.) extracted from the CAD model. The system can then extract a real dimension of a feature—corresponding to the particular feature selected from the CAD model—from an assembly unit represented in each image received from an optical inspection station on the assembly in (near) real-time according to this CAD-based measurement specification.

Alternatively, the system can retroactively apply a measurement specification to a corpus of images previously recorded and stored in a database, such as to enable the user to access dimensional statistics of a particular feature in a batch of assembly units from a previous product model when designing a next product model. For example, the system can extract an average dimension, a standard deviation, deviation from a nominal dimension, instances of deviation from the nominal dimension beyond a preset dimensional tolerance, or any other statistic related to real dimensions of a like feature across a set of (similar) assembly units represented in a set of images. The system can then present these graphical and/or numerical data to the user, through the user interface. However, the system can generate any other type of plot, graph, or chart of dimensions of the particular feature across the set of assembly units or extract any other statistic from these dimensional data.

Alternatively, the system can package these dimensions into a spreadsheet or other digital file or database; the user may then download this file for manipulation of these dimensional data within another program. However, the system can package these dimensional data into any other digital container in Block S350.

3.7.2 Outliers

In another implementation, the system detects dimensional outliers and flags individual assembly units accordingly, such as in real-time as digital photographic images are received from an optical inspection station or asynchronously based on images stored in a database. For example, in the implementation described above in which the system generates a histogram of dimensions of a like feature across the set of images, the system can: identify a subset of images representing features exhibiting dimensions falling within an upper bound (e.g., top 10%) of dimensions represented in the histogram; and flag serial numbers—stored in image metadata or extracted directly from visual data contained in these images—of these assembly units, as shown in FIG. 9A. Similarly, the system can: compare dimensions of like features extracted from the set of images directly to a nominal dimension and a dimensional tolerance associated with the feature, such as via manual entry or by extracting these data from a CAD model or engineering drawings, as described above; and flag serial numbers of assembly units containing this feature exhibiting dimensions that differ from the nominal dimension by more that the dimensional tolerance, as shown in FIG. 9B.

Therefore, in this implementation, the system can: access a target dimension of the particular feature and access a dimensional tolerance of the target dimension of the particular feature, such as by prompting the user to manually enter these values when configuring the measurement specification or by extracting these values from a CAD model or engineering drawings. The system can then: flag a serial number of a second assembly unit including a second feature—analogous to the particular feature—characterized by a real dimension differing from the target dimension by more than the dimensional tolerance.

The system can execute this process in (near) real-time as images are received from an optical inspection station deployed along an assembly line. In the foregoing example, the system can: configure the measurement specification at a first image based selection of the particular feature in the first assembly unit; identify the second feature—analogous to the first feature—in the second assembly unit represented in the second image recorded at the assembly line at a second time succeeding the first time; extract a second real dimension of the second feature in the second assembly unit from the second image according to the measurement specification; and, at approximately the second time, transmit an electronic notification—containing a the fourth assembly unit—through the user interface or to another computing device associated with the user.

In this implementation, the system can also access a range of dimensions of a feature—analogous to the particular feature selected in Block S310—associated with failure of an assembly, such as stored in a database or manually entered by the user during the current image viewing session. Upon receipt of a second image of a second assembly unit, the system can: identify a second assembly unit containing a second feature—analogous to the particular feature—and characterized by a second real dimension contained within the range of dimensions associated with assembly failure; and then serve a prompt to inspect the second assembly unit to an electronic account associated with a user, such as in (near) real-time as the second assembly unit passes through the assembly line. The system can implement similar methods and techniques to asynchronously flag an assembly unit containing a feature of dimension within this failure range. For example, if testing of a subset of assembled assembly units following production of a larger batch of assembly units later indicates a correlation between a dimension of a particular feature and failure, the system can flag other units in this larger batch that were untested for assembly units that may fail due to analogous features exhibiting dimensions within the failure range.

3.7.3 Multiple Real Dimensions

In one implementation shown in FIG. 9C, the system implements Blocks of the third method S300 described above to apply a first measurement specification and a second measurement specification—distinct from the first measurement specification—to the set of images and then compiles results of the first and second measurement specifications into one graphic or statistic.

In this implementation, the system can: receive manual selection of a second particular feature in the first assembly unit represented in the first image in Block S320; receive selection of a second measurement type for the second particular feature in Block S330; and extract a second real dimension of the second particular feature in the first assembly unit from the first image according to the second measurement type in Block S344. In this example, the system can then, for each image in the set of images: identify a second feature in an assembly unit represented in the image in Block S340, wherein the second feature in the assembly unit is analogous to the second particular feature in the first assembly unit; and extract a second real dimension of the second feature in the assembly unit from the image according to the second measurement type in Block S344. In Block S350, the system can then populate a two-dimensional graph with points representing the first measurement type across the set of images (e.g., along a first axis of the graph) and representing the second measurement type across the set of images (e.g., along a second axis of the graph). For example, the system can define a Cartesian coordinate for each image in the set as (result first measurement specification, result second measurement specification) and then represent each image in a two-dimensional scatterplot according to its Cartesian coordinate.

In this implementation, the system can also receive a mathematical model linking the first measurement specification to the second measurement specification, such as: a maximum and/or minimum difference between a result of the first measurement specification and the second measurement specification; a nominal sum and summary tolerance for a sum of a result of the first measurement specification and a result of the second measurement specification; etc. for one assembly unit in the set. The system can then implement methods and techniques described above to automatically flag an assembly unit containing features that violate either individual nominal dimensions and dimensional tolerances for the first and second measurement specifications or the model linking the first and second measurement specifications.

3.7.4 Filters

In one implementation, the system: receives a set of filter values and selection of a preexisting measurement specification from a user; filters a set of images captured by optical inspection stations in an assembly line according to the filter values; automatically applies the measurement specification to the filtered set of images, as described above, to generate a graphical plot and/or numeric representation of the dimension of the feature across the corresponding set of units; and to communicate the graphical plot and/or numeric representation to the user. For example, the user can search through or filter a set of preexisting measurement specifications configured for an assembly, build, or configuration based on an assembly line identifier, optical inspection station serial number, measurement specification origin or owner (e.g., user who originally configured the measurement specification), measurement specification name, feature name or type, etc. and select a particular measurement specification (or a set of measurement specifications) to apply to a set of images captured by an optical inspection station inserted along an assembly line. In this example, the user can also enter one or more unit filters, such as build (e.g., EVT, DVT, PVT), configuration (e.g., color, vendor, engineering design), assembly date (or date range, time range), assembly stage, unit serial number range, timestamp, optical inspection station or assembly state, fixture serial number, measurement value, measurement range, etc. The system can also store these filters, group units based on any of the foregoing parameters, and generate new plots from a set of images corresponding to a set or subset of images based on one or more filters selected by a user.

In the foregoing example, the user can enter textual, natural language filters into a prompt window, such as within a native SMS messaging application executing on a smartphone, within a native validation testing application executing on a tablet, or within a browser window on a desktop computer, and the system can implement natural language processing techniques to transform a textual string entered by the user into a set of filters for units—and to a select a corresponding set of images and/or other data—for application of the measurement specification. Alternatively, the system can issue dynamic dropdown menus for filters available for a set of units previously imaged based on a measurement specification and/or other filters selected by the user. The system can then generate a graphical plot of dimensions of the feature across the filtered set of units, as described above, and push this graphical plot back to the user, such as in the form of a static figure viewable in the native SMS text messaging application executing on the user's smartphone or in the form of an interactive graph viewable in the native validation testing application or within the browser window.

However, the system can interface with the user through the user interface executing at a local computing device in any other way to receive a measurement specification and/or assembly unit filters. The system can then: filter the set of images according to one or more filter values selected by the user to select a subset of images representing a subset of assembly units; generate a graphical, textual, or statistical representation of like features—analogous to the particular feature—contained in the subset of assembly units; and then serve this graphical, textual, or statistical representation to the user through the user interface or other native application or web browser executing on the user's computing device.

3.7.5 Notifications

In the implementation described above in which the system executes the foregoing methods and techniques in (near) real-time, the system can serve a prompt to inspect a flagged assembly unit to an electronic account associated with the user in real-time. For example, the system can render an inspection prompt containing an inspection prompt and a serial number of a flagged assembly unit directly through the user interface. For the system that executes Blocks of the third method S300 remotely from the user interface, the system can additionally or alternatively generate an SMS text message or an application-based notification containing an inspection prompt and a serial number of a flagged assembly unit and then transmit this text message or notification to a mobile computing device (e.g., a smartphone, a smartwatch) associated with the user, such as in (near) real-time when the user is occupying a building housing an assembly line or the flagged assembly unit is currently in production or is currently housed. Alternatively, the system can serve graphical, textual, and/or statistical representations of dimensions of like features across the set of assembly units asynchronously, such as when the user activates the measurement specification within the user interface or by sending daily or weekly digests of results of the measurement specification to the user via email, as described below.

In one variation, the third method S300 can also include: receiving a subscription to the measurement specification from a user, such as in the form of a request to receive updates relating to dimensions extracted from images of new assembly units according to the measurement space; and distributing the digital container to an electronic account associated with the user based on the subscription. In this variation, the system can enable the user—and other users—to subscribe to the measurement specification and can automatically push graphical and/or textual prompts—such as described above—to computing devices associated with each user subscribed to the measurement specification. For example, the system can push an electronic notification—to inspect a particular assembly unit containing a feature analogous to the particular feature and exhibiting a dimension deviating from a nominal dimension defined for the particular feature or representing a statistical outlier (i.e., not necessarily outside a predefined tolerance)—to a mobile computing device associated with each user subscribing to the measurement technique in real-time. Alternatively, the system can populate a spreadsheet containing serial numbers of assembly units containing features exhibiting such deviation from the nominal dimension, insert the spreadsheet into an image, and send the email to subscribers of the measurement specification, such as in a daily or weekly digest.

3.8 Image Review

The system can also execute the second method S200 in conjunction with the third method S300 to virtually align images by a common feature contained in assembly units represented in these images and to extract dimensions of the common or other like feature contained in these assembly units. In this implementation, the system can then define an order of images in the set based on dimensions of like features extracted from images in the set and then scroll through the set of images at the user interface according to this order, thereby enabling the user to view images of assembly units in order of increasing (or decreasing) dimension of a common feature contained in these assembly units and visually aligned by this common feature. For example, the system can: define an order of the set of images based on real dimensions of features, analogous to the particular feature, extracted from images in the set of images; virtually align images in the set of images by features analogous to the particular feature (e.g., by a corner feature or by two edge features), as described above; and, in response to a scroll input at the user interface, index through rendering images in the set of images within the user interface according to the order.

In another implementation, the system can implement Block S252 of the second method S200 in conjunction with Block S350 of the third method S300 to select two (or more) images representative of a span of dimensions of a feature—analogous to the particular feature—and to generate a composite image containing these representative images. For example, in Block S350, the system can: calculate a range of real dimensions spanning the set of real dimensions extracted from the set of images; select a second image—from the set of images—representing a second assembly unit containing a second feature analogous to the particular feature and characterized by a second dimension proximal a first end of this range of real dimensions; select a third image—from the set of images—representing a third assembly unit containing a third feature analogous to the particular feature and characterized by a third dimension proximal the opposite end of the range of real dimensions; generate a composite image including the second image and the third image overlayed over the second image, as in Block S252; and then render the composite image within the user interface. The system can then implement methods and techniques described above to combine two or more images representing a subset of assembly units containing like features representative of the set of assembly units as a whole based on real dimensions of these features extracted from the set of images.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   displaying a first image of a first assembly unit within a user interface, a form of the first image recorded at an optical inspection station;
   in response to a change in a view window of the first image at the user interface:
      displaying a first subregion of the first image within the user interface;
      identifying a set of discrete surfaces on the first assembly unit represented within the first subregion of the first image;
      selecting a first discrete surface exhibiting a greatest dimension in the first set of discrete surfaces;
      identifying a first feature that bounds the first discrete surface; and
      locating a first virtual origin on the first feature on the first assembly unit represented in the first image;
   recording a geometry and a position of the first subregion of the first image relative to the first virtual origin;
   in response to receipt of a command to advance from the first image to a second image at the user interface:
      locating a second virtual origin at a second feature on a second assembly unit represented in the second image, the second feature on the second assembly unit analogous to the first feature on the first assembly unit;
projecting the geometry and the position of the first subregion of the first image onto the second image according to the second virtual origin to define a second subregion of the second image; and
displaying the second subregion of the second image within the user interface.

2. The method of claim 1, wherein displaying the first image of the first assembly unit comprises:
retrieving a first digital photographic image from a database, the first digital photographic image recorded by the optical inspection station at a first time during an assembly period;
normalizing the first digital photographic image based on a reference image recorded at the optical inspection station to generate the first image; and
serving the first image to a computing device executing the user interface for rendering.

3. The method of claim 2, further comprising:
retrieving a second digital photographic image from the database, the second digital photographic image recorded by the optical inspection station at a second time during the assembly period; and
normalizing the second digital photographic image based on the reference image to generate the second image.

4. The method of claim 1, wherein locating the second virtual origin at the second feature on the second assembly unit represented in the second image comprises:
projecting a boundary encompassing and offset from the first virtual origin onto the second image;
identifying a set of edge features on the second assembly unit represented within a region of the second image contained within the boundary; and
identifying the second feature, in the set of edge features, exhibiting a second geometry analogous to a first geometry of the first feature; and
locating the second virtual origin on the second feature.

5. The method of claim 1,
wherein locating the first virtual origin at the first feature on the first assembly unit represented in the first image comprises locating the first virtual origin, of the first image, on the first feature defining a first corner of a first part in the first assembly unit; and
wherein locating the second virtual origin at the second feature on the second assembly unit represented in the second image comprises:
identifying a set of parts in the second assembly represented in the second image;
selecting a second part, in the set of parts, analogous to the first part; and
locating the second virtual origin, of the second image, on the second feature defining a second corner of the second part.

6. The method of claim 1:
wherein displaying the first subregion of the first image within the user interface comprises displaying the first subregion of the first image within the user interface in response to the change in the view window of the first image at a first time;
wherein identifying the first feature that bounds the first discrete surface comprises:
identifying a set of edge features on the first assembly unit within the first subregion of the first image;
at a second time succeeding the first time, receiving selection of a pixel within the first subregion of the first image; and
selecting the first feature, from the set of edge features, proximal the pixel.

7. The method of claim 1, wherein displaying the first subregion of the first image within the user interface comprises displaying the first subregion of the first image within the user interface in response to the change in the view window of the first image comprising a zoom input over the first image.

8. The method of claim 7:
wherein recording the geometry of the first subregion of the first image relative to the first virtual origin comprises recording a zoom level selected for the first subregion of the first image;
wherein recording the position of the first subregion of the first image relative to the first virtual origin comprises recording a vertical offset and a horizontal offset between the first virtual origin in the first image and an origin of the first subregion; and
wherein projecting the geometry and the position of the first subregion of the first image onto the second image according to the second virtual origin to define the second subregion of the second image comprises:
defining a geometry of a second view window according to the zoom level;
vertically offsetting an origin of the second view window from the second virtual origin within the second image according to the vertical offset;
horizontally offsetting the origin of the second view window from the second virtual origin within the second image according to the horizontal offset; and
defining a region of the second image bound by the second view window as the second subregion.

9. The method of claim 8:
wherein locating the first virtual origin on the first feature on the first assembly unit represented in the first image further comprises:
locating the first virtual origin, of a first coordinate system, on the first feature within the first image; and
aligning a first axis of the first coordinate system to the first feature;
wherein recording the geometry and the position of the first subregion of the first image relative to the first virtual origin further comprises:
recording an angular offset between an edge of the first subregion of the first image and the first axis of the first coordinate system; and
wherein locating the second virtual origin in the second image at the second feature on the second assembly unit represented in the second image comprises:
locating the second virtual origin, of a second coordinate system, on the second feature within the second image; and
aligning a second axis of the second coordinate system to the second feature; and
wherein projecting the geometry and the position of the first subregion of the first image onto the second image according to the second virtual origin to define the second subregion of the second image further comprises:
angularly offsetting an edge of the second subregion from the second axis of the second coordinate system according to the angular offset.

10. The method of claim 1, further comprising:
serving a prompt to confirm a projected geometry and a projected position of the second subregion of the second image through the user interface;
in response to receipt of confirmation of the projected geometry and the projected position of the second subregion of the second image:
  retrieving a set of images of assembly units from a database;
  locating a virtual origin in each image in the set of images; and
  projecting the geometry and the position of the first subregion of the first image onto each image in the set of images to define a set of subregions for the set of images; and
indexing through the set of subregions displayed within the user interface in response to a scroll input at the user interface.

11. The method of claim 1, further comprising:
setting a first opacity of the first subregion of the first image;
setting a second opacity of the second subregion of the second image;
overlaying the second subregion over the first subregion to generate a composite image;
displaying the composite image within the user interface;
adjusting the first opacity according to an input received at the user interface;
adjusting the second opacity as an inverse function of the first opacity; and
refreshing the composite image in response to the input.

12. The method of claim 1, further comprising:
retrieving a virtual computer-aided drafting model representing the first assembly unit;
generating a computer-aided drafting image of the virtual computer-aided drafting model at an orientation and in a perspective approximating an orientation and a position of the first assembly unit represented in the first image;
locating a third virtual origin at a third feature in the computer-aided drafting image, the third feature analogous to the first feature on the first assembly unit;
projecting the geometry and the position of the first subregion of the first image onto the virtual computer-aided drafting model according to the third virtual origin to define a third image; and
displaying a translucent form of the third image over the first subregion of the first image within the user interface.

13. The method of claim 1:
further comprising, at a second time succeeding the first time, receiving selection of a pixel within the first subregion of the first image by a user via the user interface; and
wherein identifying the set of discrete surfaces on the first assembly unit comprises identifying the set of discrete surfaces on the first assembly unit represented proximal the pixel within the first subregion of the first image.

14. A method comprising:
displaying a first image of an assembly unit in a first stage of assembly within a user interface, the first image recorded at a first optical inspection station;
locating a first virtual origin in the first image at a first feature on the assembly unit represented in the first image;
in response to receipt of a zoom input at the user interface, displaying a first subregion of the first image within the user interface;
storing a geometry and a position of the first subregion of the first image relative to the first virtual origin;
identifying the first feature on the assembly unit in a second image of the assembly unit in a second stage of assembly;
locating a second virtual origin in the second image according to the first feature;
defining a second subregion of the second image based on the geometry and the position of the first subregion of the first image and the second virtual origin;
locating a third virtual origin in the second image at a second feature on the assembly unit represented in the second image;
identifying the second feature on the assembly unit in a third image of the assembly unit in a third stage of assembly;
locating a fourth virtual origin in the third image according to the second feature;
defining a third subregion of the third image based on the geometry and the position of the second subregion of the second image and the fourth virtual origin;
in response to receipt of a command to advance from the first image to the second image at the user interface, displaying the second subregion of the second image within the user interface;
in response to receipt of a command to view the first image, the second image, and the third image concurrently at the user interface:
  setting a first opacity of the first subregion of the first image;
  setting a second opacity of the second subregion of the second image;
  merging the first subregion, the second subregion, and third subregion into a composite image; and
  displaying the composite image within the user interface.

15. The method of claim 14:
wherein displaying the first image of the first assembly unit comprises:
  retrieving a first digital photographic image from a database, the first digital photographic image recorded by the first optical inspection station arranged at a first position along an assembly line;
  normalizing the first digital photographic image based on a first reference image recorded at the first optical inspection station to generate the first image; and
  serving the first image to a computing device executing the user interface for displaying within the user interface; and
wherein displaying the second subregion of the second image within the user interface comprises:
  retrieving a second digital photographic image from the database, the second digital photographic image recorded by a second optical inspection station arranged at a second position along the assembly line; and
  normalizing the second digital photographic image based on a second reference image recorded at the second optical inspection station to generate the second image.

16. A method comprising:
displaying a first image of a first assembly unit within a user interface, the first image recorded at an optical inspection station;

in response to a change in a view window of the first image at the user interface:
  displaying a first subregion of the first image within the user interface;
  identifying a set of discrete surfaces on the first assembly unit represented within the first subregion of the first image;
  selecting a first discrete surface exhibiting a greatest dimension in the first set of discrete surfaces;
  identifying a first feature that bounds the first discrete surface; and
  locating a first virtual origin on the first feature on the first assembly unit represented in the first image;
recording a geometry and a position of the first subregion of the first image relative to the first virtual origin;
identifying a second feature represented in a second image of a second assembly unit, the second feature analogous to the first feature;
projecting the geometry and the position of the first subregion of the first image onto the second image according to the second feature to define a second subregion of the second image; and
in response to receipt of a command to advance from the first image to the second image at the user interface, displaying the second subregion of the second image within the user interface in replacement of the first image.

17. The method of claim 16:
further comprising locating a first virtual origin, of the first image, on the first feature defining a datum on a fixture retaining the first assembly unit in the optical inspection station;
wherein recording the geometry and the position of the first subregion of the first image relative to the first feature comprises recording the geometry and the position of the first subregion of the first image relative to the first virtual origin;
wherein identifying a second feature represented in a second image of a second assembly unit comprises:
  identifying a set of features represented in the second image;
  selecting the second feature, in the set of features, exhibiting dimensional characteristics and geometric characteristics approximating dimensional characteristics and geometric characteristics of the first feature; and
  locating a second virtual origin of the second image on the second feature defining a second corner of the second part; and
wherein projecting the geometry and the position of the first subregion of the first image onto the second image comprises projecting the geometry and the position of the first subregion of the first image onto the second image according to the second virtual origin to define the second subregion of the second image.

18. The method of claim 16, wherein recording the geometry and the position of the first subregion of the first image relative to the first feature represented in the first image comprises:
projecting a boundary encompassing and offset from the first feature onto the second image;
identifying a set of edge features represented within a region of the second image contained within the boundary; and
identifying the second feature, in the set of edge features, exhibiting a second geometry approximating a first geometry of the first feature.

19. The method of claim 16:
further comprising, at a second time succeeding the first time, receiving selection of a pixel within the first subregion of the first image by a user via the user interface; and
wherein identifying the set of discrete surfaces on the first assembly unit comprises identifying the set of discrete surfaces on the first assembly unit represented proximal the pixel within the first subregion of the first image.

* * * * *